US011518141B2

(12) United States Patent
Donelan et al.

(10) Patent No.: US 11,518,141 B2
(45) Date of Patent: Dec. 6, 2022

(54) WATER BARRIER EXTERIOR SHEATHING PANEL

(71) Applicant: UNITED STATES GYPSUM COMPANY, Chicago, IL (US)

(72) Inventors: Jeffrey W. Donelan, Libertyville, IL (US); Michael P. Shake, Johnsburg, IL (US); Ajith M. Rao, Gurnee, IL (US); James M. Ullett, McHenry, IL (US); Yanfei Peng, Hawthorn Woods, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 389 days.

(21) Appl. No.: 16/585,799

(22) Filed: Sep. 27, 2019

(65) Prior Publication Data
US 2020/0139674 A1 May 7, 2020

Related U.S. Application Data

(60) Provisional application No. 62/753,970, filed on Nov. 1, 2018.

(51) Int. Cl.
*B32B 9/00* (2006.01)
*B32B 15/12* (2006.01)
(Continued)

(52) U.S. Cl.
CPC .............. *B32B 9/005* (2013.01); *B32B 5/022* (2013.01); *B32B 15/12* (2013.01); *B32B 15/20* (2013.01);
(Continued)

(58) Field of Classification Search
CPC .......... F17C 2201/056; F17C 2203/066; F17C 2205/0305; F17C 2201/0109; F17C 2221/012; F17C 2270/0168; F17C 2270/0184; F17C 2221/033; F17C 2203/0604; F17C 2203/0621; F17C 2209/2154; F17C 2223/036; F17C 2260/011; F17C 2203/0646; F17C 2203/012; F17C 1/06; F17C 2223/0123;
(Continued)

(56) References Cited

U.S. PATENT DOCUMENTS 4,450,022 A 5/1984 Galer
4,477,533 A 10/1984 Phillips
(Continued)

FOREIGN PATENT DOCUMENTS

GB 1602592 A 11/1981

OTHER PUBLICATIONS

Technical Data Sheet, 20# Nat Kraft / 000285 Foil Duplex, International Converter a Novolex Brand, Jun. 9, 2015.
(Continued)

*Primary Examiner* — Vishal I Patel
(74) *Attorney, Agent, or Firm* — Vorys, Sater, Seymour and Pease LLP; Pradip Sahu; Philip T. Petti

(57) ABSTRACT

An exterior sheathing cementitious panel which prevents water penetration and air leakage is provided. Methods for manufacturing exterior sheathing cementitious panels with a highly efficient integrated air/water barrier sheet are also provided. An exterior sheathing system employing the exterior sheathing cementitious panel is provided.

19 Claims, 5 Drawing Sheets

(51) Int. Cl.
    *B32B 5/02* (2006.01)
    *E04C 2/04* (2006.01)
    *B32B 15/20* (2006.01)
    B32B 37/18 (2006.01)
    B32B 37/00 (2006.01)

(52) U.S. Cl.
    CPC .............. *E04C 2/044* (2013.01); *B32B 37/00* (2013.01); *B32B 37/18* (2013.01); *B32B 2262/0253* (2013.01); *B32B 2262/101* (2013.01); *B32B 2305/28* (2013.01); *B32B 2307/7242* (2013.01); *B32B 2307/7265* (2013.01); *B32B 2311/00* (2013.01); *B32B 2315/06* (2013.01); *B32B 2315/08* (2013.01); *B32B 2419/00* (2013.01)

(58) Field of Classification Search
    CPC ...... F17C 2203/0663; F17C 2205/0397; F17C 2203/0619; B29C 63/0073; B29C 63/24; B29C 63/0069; B29C 53/822; B29C 53/56; B29C 53/845; B29L 2031/7172; B29L 2031/7156; B29K 2063/00
    See application file for complete search history.

(56) References Cited

U.S. PATENT DOCUMENTS

| | | | |
|---|---|---|---|
| 4,488,917 A | 12/1984 | Porter et al. | |
| 4,504,335 A | 3/1985 | Galer | |
| 4,916,004 A | 4/1990 | Ensminger et al. | |
| 5,397,631 A | 3/1995 | Green et al. | |
| 5,643,510 A | 7/1997 | Sucech | |
| 5,644,880 A | 7/1997 | Lehnert et al. | |
| 5,683,635 A | 11/1997 | Sucech et al. | |
| 5,714,001 A | 2/1998 | Savoly et al. | |
| 5,768,841 A | 6/1998 | Swartz et al. | |
| 6,279,284 B1 | 8/2001 | Moras | |
| 6,342,284 B1 | 1/2002 | Yu et al. | |
| 6,494,609 B1 | 12/2002 | Wittbold et al. | |
| 6,632,550 B1 | 10/2003 | Yu et al. | |
| 6,774,146 B2 | 8/2004 | Savoly et al. | |
| 6,800,131 B2 | 10/2004 | Yu et al. | |
| 6,874,930 B2 | 4/2005 | Wittbold et al. | |
| 7,763,134 B1 | 7/2010 | Kumar | |
| 8,038,790 B1 | 10/2011 | Dubey et al. | |
| 8,061,108 B2 | 11/2011 | Tonyan et al. | |
| 8,070,895 B2 | 12/2011 | Engbrecht et al. | |
| 9,163,397 B2 | 10/2015 | Willson et al. | |
| 9,302,448 B2 | 4/2016 | Dubey et al. | |
| 9,739,059 B2 | 8/2017 | Thomas et al. | |
| 9,834,929 B2 | 12/2017 | Boydston et al. | |
| 2002/0045074 A1 | 4/2002 | Yu et al. | |
| 2002/0083671 A1 | 7/2002 | Clausen et al. | |
| 2003/0194584 A1 | 10/2003 | Clausen et al. | |
| 2004/0103610 A1 | 6/2004 | Axsom | |
| 2004/0231916 A1 | 11/2004 | Englert et al. | |
| 2005/0019618 A1 | 1/2005 | Yu et al. | |
| 2006/0035112 A1 | 2/2006 | Veeramasuneni et al. | |
| 2007/0022913 A1 | 2/2007 | Wang et al. | |
| 2007/0149083 A1 | 6/2007 | Agrawal | |
| 2012/0285533 A1 | 11/2012 | Chang | |
| 2014/0272404 A1 | 9/2014 | Shake et al. | |
| 2016/0264461 A1 | 9/2016 | Peng et al. | |
| 2017/0282510 A1 | 10/2017 | Peet et al. | |
| 2017/0284093 A1* | 10/2017 | Lai | B32B 27/32 |
| 2017/0326840 A1 | 11/2017 | Shake et al. | |
| 2018/0010338 A1 | 1/2018 | Boydston et al. | |
| 2018/0036693 A1 | 2/2018 | Dubey et al. | |
| 2018/0036909 A1 | 2/2018 | Dubey et al. | |
| 2018/0036911 A1 | 2/2018 | Dubey et al. | |
| 2018/0036912 A1* | 2/2018 | Dubey | B28C 5/1238 |

OTHER PUBLICATIONS

Section 07 5X XX-USG Securock® Brand Glass-Mat Roof Board, Gypsum Board, Apr. 3, 2017.

USG Durock™ Brand Waterproofing Membrane and Band, USG Tile & Flooring Solutions, CB595-USA-ENG/rev. 3-17, USG Corporation, 2017.

USG Securock® Brand Ultralight Glass-Mat Roof Board, USG Roofing Solutions, RF32-USA-ENG/rev. 3-18, USG Corporation, 2018.

* cited by examiner

WATER BARRIER EXTERIOR SHEATHING PANEL

FIELD OF THE INVENTION

This invention relates to a building exterior sheathing cementitious panel with an air/water barrier sheet and methods for manufacturing and installing the panel.

BACKGROUND OF THE INVENTION

A vapor diffusion retarder is an air/water barrier provided as part of a building envelope barrier system to stop the unintended passage of air, water, and other elements into and out of a building enclosure. Vapor diffusion retarders can help control moisture in: basements, ceilings, crawlspaces, floors, slab-on-grade foundations, and walls.

In most building climates, vapor barriers, or—more accurately—vapor diffusion retarders, can be part of a moisture control strategy for a commercial or residential building. A vapor barrier or vapor diffusion retarder is a material that reduces the rate at which water vapor can move through a material. The older term "vapor barrier" is still used even though "vapor diffusion retarder" is more accurate. The ability of a material to retard the diffusion of water vapor is measured in units known as "perms" or permeability and reported as a perm rating. The perm rating is a standard measure of the water vapor permeability of a material. The higher the number, the more readily water vapor (in the gaseous state) can diffuse through the material.

The International Residential Code (IRC) describes three classes of water vapor retarders. A perm rating of 0.1 perms or less is considered a Class I impermeable vapor retarder (which is also considered a vapor barrier). A perm rating greater than 0.1 perms and less than or equal to 1.0 perms is considered a Class II semi-permeable vapor retarder. A perm rating greater than 1.0 perms and less than or equal to 10 perms is a Class III permeable vapor retarder. A perm rating greater than 10 is highly permeable and not considered to be a vapor retarder.

In particular permeance is measured according to the 2018 IBC and IRC, Chapter 2 Definition which states:

VAPOR RETARDER CLASS. A measure of a material or assembly's ability to limit the amount of moisture that passes through that material or assembly. For purposes of the present specification, Vapor Retarder Class shall be defined using the desiccant method with Procedure A of ASTM E96 (2016) as follows:
Class I: 0.1 perm or less.
Class II: 0.1<perm≤1.0 perm.
Class III: 1.0<perm≤10 perm.

For purposes of the present specification the units of perm are as the International Residential Code defines it as being measured using the desiccant method with procedure A of ASTM E96 (2016).

Some examples of materials for Classes I, II, and Ill are described below.
Class I vapor retarders (0.1 perms or less):
Glass
Sheet metal
Polyethylene sheet
Rubber membrane
Class II vapor retarders (greater than 0.1 perms and less than or equal to 1.0 perms):
Unfaced expanded or extruded polystyrene
30 pound asphalt coated paper
Plywood
Bitumen coated kraft paper
Class III vapor retarders (greater than 1.0 perms and less than or equal to 10 perms):
Fiberglass insulation (unfaced)
Cellulose insulation
Board lumber
Concrete block
Brick
15-pound asphalt coated paper
House wrap Cementitious boards, such as gypsum board and cement board, are useful in a variety of applications, some of which require a degree of water resistance. Traditional paper-faced cementitious articles do not always perform well under high moisture conditions, or upon exposure to the outdoors. Thus, for such applications, it is often desirable to use a cementitious article that is faced with a glass or polymer-based fiber mat instead of paper. It also is advantageous to use additives in the cementitious core that improve the water resistance of the core material itself.

The manufacturing process of cementitious panels, such as gypsum board and cement board, typically involves depositing a cementitious slurry over a first facing material and covering the wet slurry with a second facing material of the same or different type, such that the cementitious slurry is sandwiched between the two facing materials. Thereafter, excess water is removed from the slurry by drying. The cementitious slurry is allowed to harden to produce a solid article prior to final drying.

However, the permeability of the fibrous mat facing material allows water vapor to penetrate the mat facing material to the cementitious core. In order to alleviate this problem, exterior coatings of hydrophobic resins are sometimes applied. However, depending on the coating composition and thickness the water permeability of such composites is permeable (a perm rating in the range from 10 perms to 1.0 perm), or semi-impermeable (a perm rating in the range from 1.0 perm to 0.1 perm).

US Patent Application Publication No. 2004/0103610 of Axsom discloses a multipurpose composite wallboard panel as having an aluminum sheet (14) attached by means of an adhesive (16) to a wallboard panel (12), such as a gypsum wallboard panel. Such a composite panel can readily be handled and quickly attached to the framework of buildings for the purpose of bracing, finishing, fireproofing, and thermally insulating wall structures in a single wall sheathing procedure (see Abstract).

US Patent Application Publication No. 2014/0272404 of Shake et al. discloses an exterior sheathing panel with an integrated air/water barrier membrane. The panel includes a cementitious core, a cover sheet, an optional cover sheet, and an air/water barrier membrane. The cementitious core can include any core intended for external applications. The cementitious core can include a gypsum core. The cover sheets can be formed of glass fibers. The air/water barrier membrane is formed from a liquid polymer formulation.

U.S. Pat. No. 9,163,397 of Willson et al. discloses a foil-backed gypsum containing wallboard (Abstract). Its interior wallboards or the sheathing boards are made from gypsum and have at least one low-emittance surface. The low-emittance surface can be laminated a metallic foil to the gypsum-containing board. The metallic foil or sheet used as a low emittance surface is perforated before or after lamination so that the gypsum-containing board with the metallic foil or sheet surface has a water vapor permeance greater than 1 Perm, preferably greater than 5 Perms.

US Patent Application Publication No. 2002/0083671 (US '671) of Clausen et al. and its continuation-in-part US Patent Application Publication No. 2003/0194584 of Clausen et al. US '671, paragraph [0005] each disclose a wallboard panel that includes a gypsum core, non-biodegradable glass fiber matts, adhesive layer, and decorative vinyl layer. They describe vinyl sheeting as a water resistant surface. However, US'584 also discloses the decorative plastic sheeting is water vapor permeable.

US Patent Application Publication No. 2007/0149083 of Agrawal discloses a board, cementitious core, facers, facing material, and laminate layers. Examples of facing material include paper material and non-woven fiberglass mat. The laminate layers are formed from a material that has a reduced degree of permeability to the cementitious slurry in comparison to the facing material, for example, polyethylene or cellulosic material. The laminate material is attached to the facing material by a lamination process such as adhesive bonding or heat welding.

US Patent Application Publication No. 2017/0284093 of Lai et al. discloses a building board where one or both of the fibrous mat facings is a fiber mat/polymer sheet laminate. The building board has low water absorption and a high level surface finish. The fiber mat/polymer sheet laminate of the board has the following components: a fiber mat, an adhesive layer, an adhesion promoter, a polymer sheet, and a coating. The coating increases the adhesion between polymer sheet and a further added paint or joint compound.

U.S. Pat. No. 8,061,108 to Tonyan et al discloses to assist in waterproofing the foundations made of structural cement panels (SCP panels), the seams between the SCP panels, e.g., SCP panels 4, 70, 77, are typically sealed with a liquid applied bitumen-type water barrier or an adhered waterproof polymer sheet. In general, waterproofing the foundation system could be achieved using either sheet membranes or liquid membranes. Sheet membranes are typically about 60 mil or more, e.g., 60-100 mil, thick membranes composed of rubberized asphalt laminated to a waterproof polyethylene film. A typical sheet material is a self-adhering rubberized asphalt membrane. This typically 60-mil-thick membrane is composed of rubberized asphalt laminated to a waterproof polyethylene film. The asphalt side is sticky but covered by a release paper which is removed during use.

There remains a desire for new water resistant cementitious articles, as well as methods of preparing such articles.

BRIEF SUMMARY OF THE INVENTION

There is a need for cementitious panels having a perm rating of 0.15 or less, preferably that are water impermeable (preferably 0.1 perm or less). There is also a need for cementitious panels pre-fabricated to have an air/water barrier layer to have a perm rating of 0.15 or less, preferably to be water impermeable. In the present specification the term pre-fabricated means the panel is made to have the barrier layer at a manufacturing facility before delivery to a building site.

In one aspect, the present disclosure is directed to a building cementitious panel, suitable as an exterior sheathing panel, which prevents water penetration and air leakage. In particular, the invention provides a building exterior sheathing panel comprising:

a cementitious panel comprising a cementitious core selected from a gypsum panel comprising a gypsum panel core layer, wherein the gypsum panel core layer comprises greater than 75 weight % calcium sulfate dihydrate, typically at least 85 weight % calcium sulfate dihydrate, more typically at least 95 weight % calcium sulfate dihydrate, and a gypsum panel fibrous mat attached as a cover sheet to the gypsum panel core layer, wherein the gypsum panel fibrous mat comprises at least one of polymer fibers, glass fibers, mineral fibers or a combination thereof, wherein the gypsum panel fibrous mat has an absence of paper fibers, and wherein the gypsum panel fibrous mat has an absence of cellulose or a cement panel comprising a cement panel core layer, wherein the cement panel cementitious core is made from an aqueous mixture containing 50 to 100 wt. % reactive powder on a dry (water free) basis, wherein the reactive powder comprises at least 10 weight percent set hydraulic cement and at most 75 wt. % calcium sulfate dihydrate, an air/water barrier sheet, and an adhesive layer between the cementitious panel and the air/water barrier sheet which contacts an entire surface of a side of the cementitious panel and an entire surface of a side of the air/water barrier sheet, wherein if the adhesive is between the gypsum panel and the air/water barrier sheet the fibrous mat cover sheet is between the cementitious core and the air/water barrier sheet and contacts the adhesive, wherein each respective said air/water barrier sheet is individually attached to only a single respective said cementitious panel, wherein each respective said air/water barrier sheet entirely covers a side of the respective cementitious panel, wherein the air/water barrier sheet has a perm rating in the range of less than or equal to 0.15, preferably less than or equal to 0.1, the air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheet, or combinations thereof adhered by the layer of adhesive to the at least one fibrous mat-faced surface of the fibrous mat-faced cementitious panel, wherein the metal sheet and metal sheet of the coated metal sheet have a thickness between 0.0002 and 0.005 inches, typically 0.0002-0.003 inches, wherein the perm rating is according to a desiccant method with Procedure A of ASTM E96 (2016).

The cementitious core of the gypsum panel comprises set gypsum, namely calcium sulfate dihydrate. This results from setting a gypsum slurry comprising at least one calcium sulfate material.

The cementitious core of the cement panel comprises at least one hydraulic cement. Preferably the cementitious core of the cement panel comprises Portland cement, or a mixture of the hydraulic cement and at least one calcium sulfate material.

Generally a cementitious panel useful in the present invention is a fibrous mat-faced gypsum panel comprising a cementitious core comprising greater than 75 weight % calcium sulfate dihydrate, typically at least 85 weight % calcium sulfate dihydrate, more typically at least 95 weight % calcium sulfate.

Generally a cementitious panel useful in the present invention is a cement panel comprising a cementitious core made from an aqueous mixture containing 50 to 100 wt. % (preferably 80 to 100 wt. %) reactive powder on a dry (water free) basis, wherein the reactive powder comprises at least 10 weight percent set hydraulic cement and at most 75 wt. % calcium sulfate dihydrate. Optionally the cement panel has a layer of scrim embedded into or on the surface of the core and/or glass fibers uniformly distributed through the core. The reactive powder of the cement panel cementitious core is typically at least 25 weight % hydraulic cement, more typically more than 30 weight %, furthermore typically at least 40 weight %, and most typically at least 60 weight % hydraulic cement.

In particular, the air/water barrier sheet comprises a layer of aluminum foil or a laminate foil of metal, typically aluminum, and polymer. Such a laminate is typically (a) a layer of aluminum foil attached to a layer of polymer or (b) a polymer sheet metallized with aluminum by sputtering. The layer of polymer for a polymer sheet or laminate foil of metal and polymer is typically polyethylene, polyacrylate, polyurethane, polystyrene, styrene/acrylic co-polymers, rubber and combinations thereof. The layer of polymer for a polymer sheet or laminate foil of metal and polymer typically has an absence of calcium carbonate.

Preferably the at least one fibrous mat comprises glass fibers.

Preferably the adhesive on at least one fibrous mat-faced surface of the fibrous mat-faced cementitious panel is an acrylic adhesive.

The adhesive and the air/water barrier of the exterior sheathing panel of the invention, overlay the entire at least one fibrous mat-faced surface of the fibrous mat-faced cementitious panel.

The exterior sheathing panel of the invention has an absence of paper. The exterior sheathing panel of the invention has an absence of cellulose. The adhesive typically has an absence of calcium carbonate. The polymer sheet typically has an absence of calcium carbonate.

If desired, an antimicrobial/antifungal agent is added to a cementitious core for the gypsum panel or the cement panel, a cover sheet and/or the air/water barrier sheet if made of polymer. Suitable antimicrobial agents include 2-(4-thiazolyl) benzimidazole, silver zeolite, zinc oxide and zinc pyrithione.

If additional water resistance is desired the invention combines an aqueous siloxane dispersion comprising about 4 wt. % to about 8 wt. % siloxane in water with a cementitious mixture to provide the cementitious slurry prior to deposition of the cementitious slurry for the gypsum panel or the cement panel.

In another aspect, the invention provides methods of preparing exterior sheathing panel of the invention described in the present disclosure.

A first method of making exterior sheathing panel from a gypsum panel or a cement panel, comprises:

providing a cementitious panel comprising a cementitious core selected from a gypsum panel comprising a gypsum panel core layer, wherein the gypsum panel core layer comprises greater than 75 weight % calcium sulfate dihydrate, typically at least 85 weight % calcium sulfate dihydrate, more typically at least 95 weight % calcium sulfate dihydrate, and a gypsum panel fibrous mat attached as a cover sheet to the gypsum panel core layer, wherein the gypsum panel fibrous mat comprises at least one of polymer fibers, glass fibers, mineral fibers or a combination thereof, wherein the gypsum panel fibrous mat has an absence of paper fibers, and wherein the gypsum panel fibrous mat has an absence of cellulose, or a cement panel comprising a cement panel core layer, wherein the cement panel cementitious core is made from an aqueous mixture containing 50 to 100 wt. % reactive powder on a dry (water free) basis, wherein the reactive powder comprises at least 10 weight percent set hydraulic cement and at most 75 wt. % calcium sulfate dihydrate, providing an air/water barrier sheet which overlays the cementitious panel and is attached to the cementitious panel, wherein the air/water barrier sheet comprises an air/water barrier layer, wherein the air/water barrier sheet optionally has an air/water barrier sheet fibrous mat layer attached to the air/water barrier layer, wherein the air/water barrier sheet fibrous mat, if present, comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose, locating an adhesive layer between the cementitious panel and the air/water barrier layer, wherein the adhesive layer attaches an entire surface of a side of the air/water barrier sheet to the gypsum panel fibrous mat on a side of the gypsum panel facing the air/water barrier sheet, or wherein the adhesive layer attaches an entire surface of a side of the air/water barrier sheet to a side of the cement panel facing the air/water barrier sheet, or wherein the adhesive layer attaches an entire surface of a side of the air/water barrier layer to the air/water barrier sheet fibrous mat layer when the air/water barrier sheet fibrous mat layer is embedded in the cement core layer, wherein each respective said air/water barrier sheet is individually attached to only a single respective said cementitious panel, wherein each respective said air/water barrier sheet entirely covers a side of the respective cementitious panel, wherein the air/water barrier sheet has a perm rating in the range of less than or equal to 0.15, preferably less than or equal to 0.1, the air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheet, or combinations thereof adhered by the layer of adhesive to the at least one fibrous mat-faced surface of the fibrous mat-faced cementitious panel, wherein the metal sheet and metal sheet of the coated metal sheet have a thickness between 0.0002 and 0.005 inches, typically 0.0002-0.003 inches, wherein the perm rating is according to a desiccant method with Procedure A of ASTM E96 (2016).

The cementitious core of the gypsum panel comprises set gypsum, namely calcium sulfate dihydrate. This results from setting a gypsum slurry comprising at least one calcium sulfate material.

The cementitious core of the cement panel comprises at least one hydraulic cement. Preferably the cementitious core of the cement panel comprises Portland cement, or a mixture of the hydraulic cement and at least one calcium sulfate material.

Thus, before applying the air/water barrier sheet, the cementitious panel has been cut to size on a panel manufacturing line. After applying the air/water barrier sheet, the cementitious panel is suitable for shipping to a building site.

The coating of at least one entire surface of at least one of the cementitious panel or the air/water barrier sheet with the layer of adhesive may be by spray coating, roll coating or flood coating to provide at least one said adhesive layer suitable to be located between the cementitious panel and the air/water barrier sheet.

Thus, in the first method the layer of adhesive may be applied to a side of the cementitious panel to form a laminate having the adhesive layer; and then the air/water barrier sheet is applied to contact the adhesive layer. In the alternative in the first method, the layer of adhesive may be applied to the air/water barrier sheet to form a laminate having the adhesive layer; and then the laminate is applied to the cementitious panel to contact the adhesive layer with a side of the cementitious panel.

In the field if a barrier sheet is applied to a wall, the wall is put up first and then the barrier sheet is applied across multiple panels of the wall such that a single sheet covers multiple panels of the wall. In contrast, the present invention attaches a single respective sheet to a single respective cementitious panel after the panel was cut on the assembly line. This provides a pre-fabricated exterior sheathing panel having its own air/water barrier sheet. This prefabricated exterior sheathing panel is easier to use in the field. For instance, the present invention typically applies the air/water barrier sheet without an adhesion promoting primer. In contrast, a primer is typically used in the field. Also, this prefabricated exterior sheathing panel can be more precisely made in a manufacturing facility than it can be in the field. Another advantage is that the present invention can use adhesives which are not pressure sensitive adhesives. Thus, for example the present invention can use adhesives that set or cross-link or adhesives which employ heat to bond, e.g., hot-melt adhesives.

In a second method for making exterior sheathing panel having the cement panel cementitious core comprising set hydraulic cement, the air/water barrier layer is applied during manufacture of the cementitious cement. Optionally a layer of scrim is embedded into or on the surface of the cement core and/or glass fibers are uniformly distributed in the cement core.

This second method of making exterior sheathing panel having the cement panel, wherein the cement panel cementitious core is made from an aqueous mixture containing 50 to 100 wt. % reactive powder on a dry (water free) basis, wherein the reactive powder comprises at least 10 weight percent set hydraulic cement and at most 75 wt. % calcium sulfate dihydrate, comprises:

providing an air/water barrier sheet comprising an outer layer of an air/water barrier sheet fibrous mat layer attached to an air/water barrier layer, wherein the air/water barrier sheet fibrous mat comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose, feeding the air/water barrier sheet onto a moving surface of the manufacturing line with the fibrous mat facing up away from the moving surface, optionally feeding the scrim to overlay the air/water barrier sheet fibrous mat facing up away from the moving surface;

then depositing the aqueous mixture on the air/water barrier sheet fibrous mat and optionally the scrim while the air/water barrier sheet and optionally the scrim are moving on the moving surface, wherein the aqueous mixture penetrates the fibrous mat and if the optional scrim is present, embeds the optional scrim, and then allowing the aqueous mixture to set (harden) to form a panel precursor and cutting the panel precursor to a desired length to form the exterior sheathing panels having the cement panel core, wherein each respective said air/water barrier sheet is individually attached to only a single respective said cementitious panel, wherein each respective said air/water barrier sheet entirely covers a side of the respective cementitious panel, wherein an adhesive layer is located between the cementitious panel and the air/water barrier layer, wherein the adhesive layer attaches an entire surface of a side of the air/water barrier layer to the air/water barrier sheet fibrous mat layer when the air/water barrier sheet fibrous mat layer is embedded in the cement core layer, wherein each exterior sheathing panel has one said air/water barrier sheet attached to only a single respective said cementitious panel, wherein each respective said air/water barrier sheet entirely covers a side of the respective cementitious panel, wherein the air/water barrier sheet has a perm rating in the range of less than or equal to 0.15, preferably less than or equal to 0.1, the air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheet, or combinations thereof adhered by the layer of adhesive to the at least one fibrous mat-faced surface of the fibrous mat-faced cementitious panel, wherein the metal sheet and metal sheet of the coated metal sheet have a thickness between 0.0002 and 0.005 inches, typically 0.0002-0.003 inches, wherein the perm rating is according to a desiccant method with Procedure A of ASTM E96 (2016).

In another aspect, the present disclosure is directed to an exterior sheathing system comprising framing to which is attached at least one exterior sheathing panel of the invention which prevents water penetration and air leakage. In particular, the invention provides an exterior sheathing panel of the invention as described in the present disclosure, wherein the air/water barrier exteriorly faces away from the framing. The exterior sheathing panel of the invention would be used on the exterior of a building, typically an exterior wall, to provide an impermeable water/air barrier and radiant thermal barrier. The framing is of wood, metal or any other building framing material. The exterior sheathing panels are attached to the framing by screws, nails, glue, or other building fasteners. Preferably the exterior sheathing panel has no perforations except for perforations made by the screws or nails.

For purposes of this specification the terms "board" and "panel" are interchangeable.

These and other advantages of the present invention, as well as additional inventive features, will be apparent from the description of the invention provided herein.

DETAILED DESCRIPTION OF THE INVENTION

Figure 1:
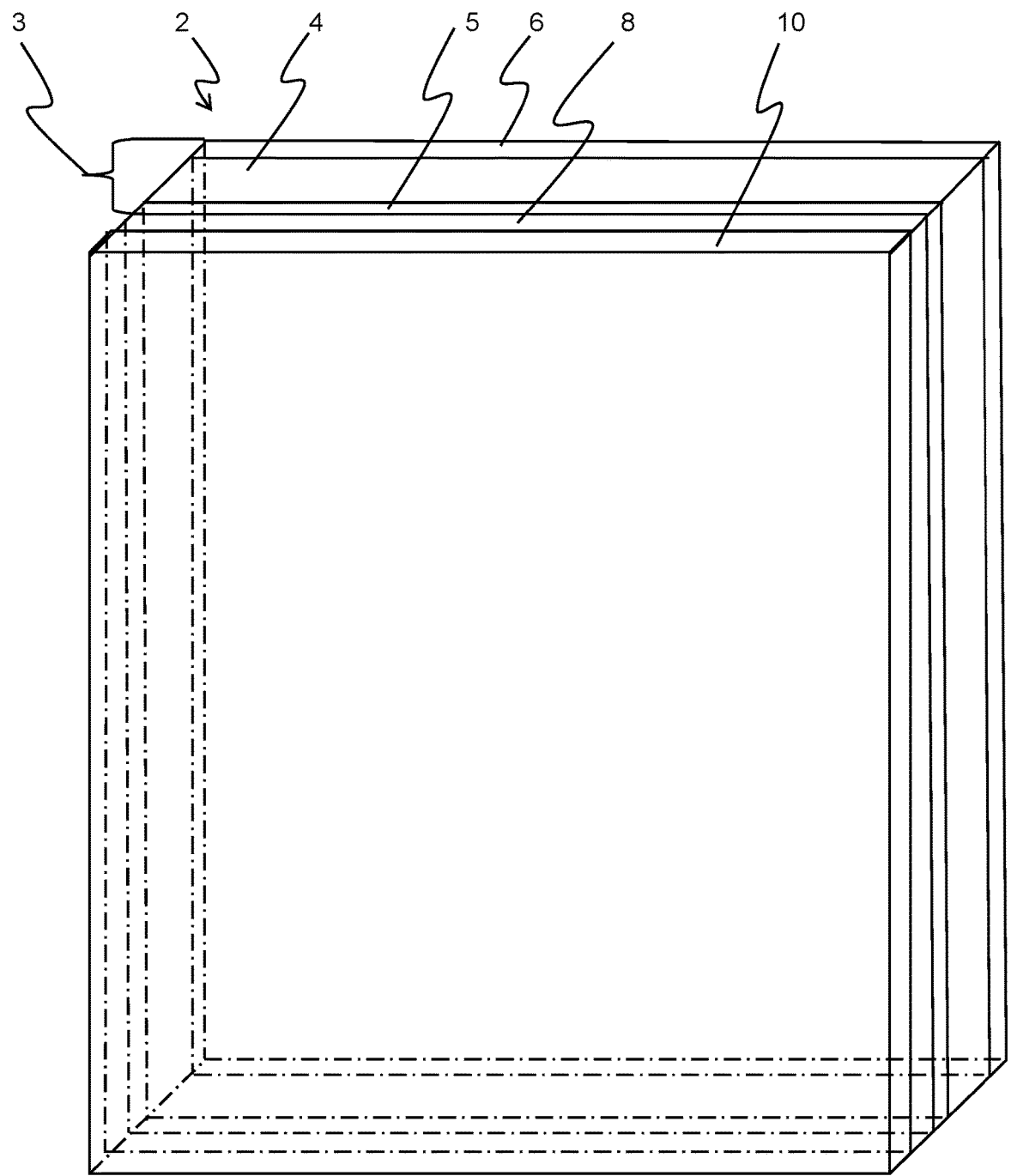
FIG. 1 shows a perspective view of a first example of an exterior sheathing panel of the present invention comprising a fibrous mat-faced gypsum board with an air/water barrier sheet adhered to a surface of the fibrous mat-faced gypsum board.

The present invention is a fibrous mat gypsum sheathing product or a cement board with a laminated foil, polymer sheet, or combination of both on a surface. The product would be used on the exterior of a building to provide an impermeable water/air barrier and potentially also a radiant thermal barrier.

The inventive product is a gypsum board that comprises a water/air barrier sheet made of a low-permeability material which is on a fibrous mat-faced, non-combustible, moisture and mold resistant board.

The present invention provides an exterior sheathing panel which prevents water penetration and air leakage by including a building cementitious panel or board (e.g., gypsum board, cement board, etc.) that has an air/water barrier sheet adhered to its surface. This exterior sheathing panel can provide an easy to install single panel that eliminates the need to individually install separate air and water resistant barriers at the jobsite. This present disclosure also provides methods of making these exterior sheathing panels with air/water barrier sheets.

In particular, the invention provides a building cementitious panel, suitable as an exterior sheathing panel, which prevents water penetration and air leakage. In particular, the invention provides an exterior sheathing panel comprising:

a cementitious panel comprising a cementitious core selected from:

a gypsum panel comprising a gypsum panel core layer, wherein the gypsum panel core layer comprises greater than 75 weight % calcium sulfate dihydrate, typically at least 85 weight % calcium sulfate dihydrate, more typically at least 95 weight % calcium sulfate dihydrate, and a gypsum panel fibrous mat attached as a cover sheet to the gypsum panel core layer, wherein the gypsum panel fibrous mat comprises at least one of polymer fibers, glass fibers, mineral fibers or a combination thereof, wherein the gypsum panel fibrous mat has an absence of paper fibers, and wherein the gypsum panel fibrous mat has an absence of cellulose, or a cement panel comprising a cement panel core layer, wherein the cement panel cementitious core is made from an aqueous mixture containing 50 to 100 wt. % reactive powder on a dry (water free) basis, wherein the reactive powder comprises at least 10 weight percent set hydraulic cement and at most 75 wt. % calcium sulfate dihydrate, an air/water barrier sheet which overlays the cementitious panel and is attached to the cementitious panel, wherein the air/water barrier sheet comprises an air/water barrier layer, wherein the air/water barrier sheet optionally has an air/water barrier sheet fibrous mat layer attached to the air/water barrier layer, wherein the air/water barrier sheet fibrous mat, if present, comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose, an adhesive layer between the cementitious panel and the air/water barrier layer, wherein the adhesive layer attaches an entire surface of a side of the air/water barrier sheet to the gypsum panel fibrous mat on a side of the gypsum panel facing the air/water barrier sheet, or wherein the adhesive layer attaches an entire surface of a side of the air/water barrier sheet to a side of the cement panel facing the air/water barrier sheet, or wherein the adhesive layer attaches an entire surface of a side of the air/water barrier layer to the air/water barrier sheet fibrous mat layer when the air/water barrier sheet fibrous mat layer is embedded in the cement core layer, wherein each respective said air/water barrier sheet is individually attached to only a single respective said cementitious panel, wherein each respective said air/water barrier sheet entirely covers a side of the respective cementitious panel;

wherein the air/water barrier sheet has a perm rating in the range of less than or equal to 0.15, preferably less than or equal to 0.1, the air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheet, or combinations thereof adhered by the layer of adhesive to the at least one fibrous mat-faced surface of the fibrous mat-faced cementitious panel, wherein the metal sheet and metal sheet of the coated metal sheet have a thickness between 0.0002 and 0.005 inches, typically 0.0002-0.003 inches, wherein the perm rating is according to a desiccant method with Procedure A of ASTM E96 (2016).

For example, the invention can attach a waterproofing membrane (which has a non-woven fibrous mat layer and a waterproofing layer) to cement panels which do not have a fibrous mat with adhesive as secondary process. Or, the cement can be embedded into the non-woven mat of the waterproofing membrane during production (in-situ process). However, an air/water barrier sheet used in the present invention can have a fibrous mat layer even if the board has a fibrous mat layer. Thus, the invention can also use adhesive to attach the non-woven mat of the waterproofing membrane to gypsum panels which have a fibrous mat.

FIG. 1 shows a perspective view of an exterior sheathing panel 2 of the present invention. The exterior sheathing panel 2 employs a fibrous mat-faced gypsum board 3 having a gypsum core 4 and fibrous mat facing 5 on its front side and fibrous mat facing 6 on its rear side. The air/water barrier sheet 10 of a low-permeability material is adhered by a layer of adhesive 8 to the fibrous mat facing 5 on the front side of the gypsum board 3. If desired, the fibrous mat facing 6 on the other face of the fibrous mat-faced gypsum board can have a second layer of adhesive and a second air/water barrier sheet of low-permeability material adhered thereto (not shown).

Figure 2:
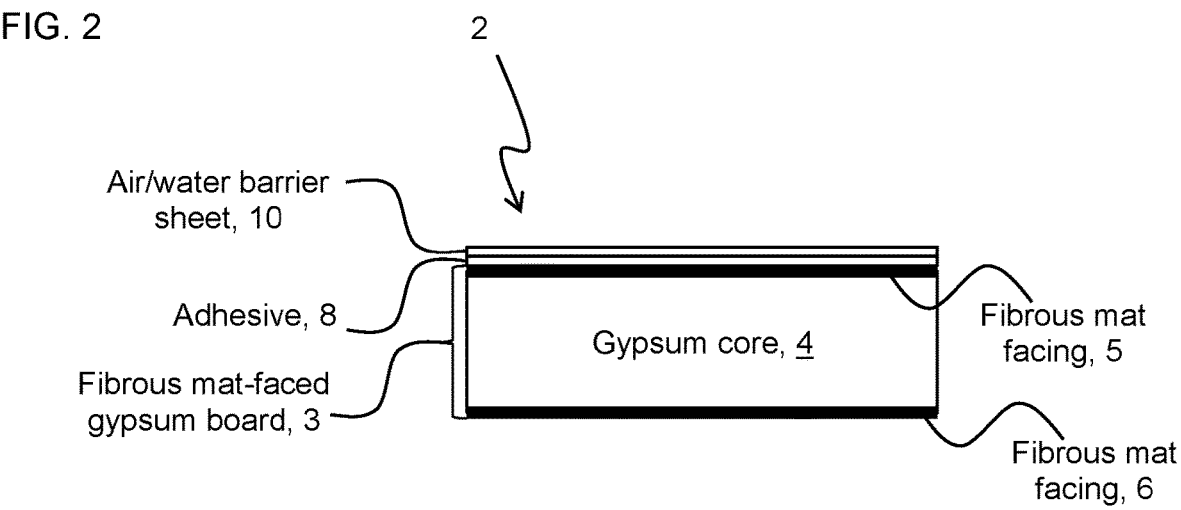
FIG. 2 shows a side cross sectional view of the first example of an exterior sheathing panel of the present invention comprising a fibrous mat-faced gypsum board with an air/water barrier sheet adhered to a surface of the fibrous mat-faced gypsum board.

FIG. 2 shows a cross-sectional view of the exterior sheathing panel 2 of the present invention of FIG. 1 employing a fibrous mat-faced gypsum board 3 to which the air/water barrier sheet 10 of a low-permeability material is adhered. The fibrous mat-faced gypsum board 3 comprises the gypsum core 4 and the fibrous mat facing 5, 6 on each face of the gypsum core 4. The layer of adhesive 8 adheres the air/water barrier sheet 10 to the fibrous mat facing 5 on the front side of the gypsum board 3.

Figure 3:
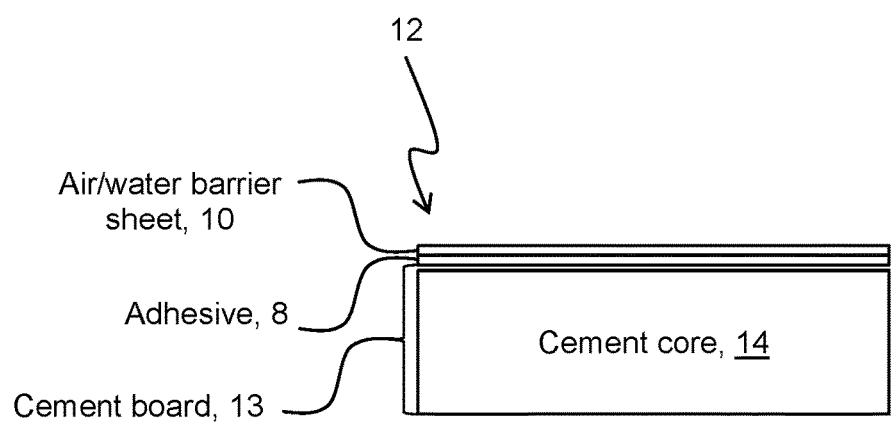
FIG. 3 shows a side cross sectional view of an example of an exterior sheathing panel of the present invention comprising a cement board with an air/water barrier sheet adhered to a surface of the cement board.

FIG. 3 shows a cross-sectional view of the exterior sheathing panel 12 of the present invention employing a cement board 13 to which the air/water barrier sheet 10 of a low-permeability material is adhered. The cement board 13 comprises the cement core 14. The layer of adhesive 8 adheres the air/water barrier sheet 10 to the front side of the cement board 13.

Figure 3A:
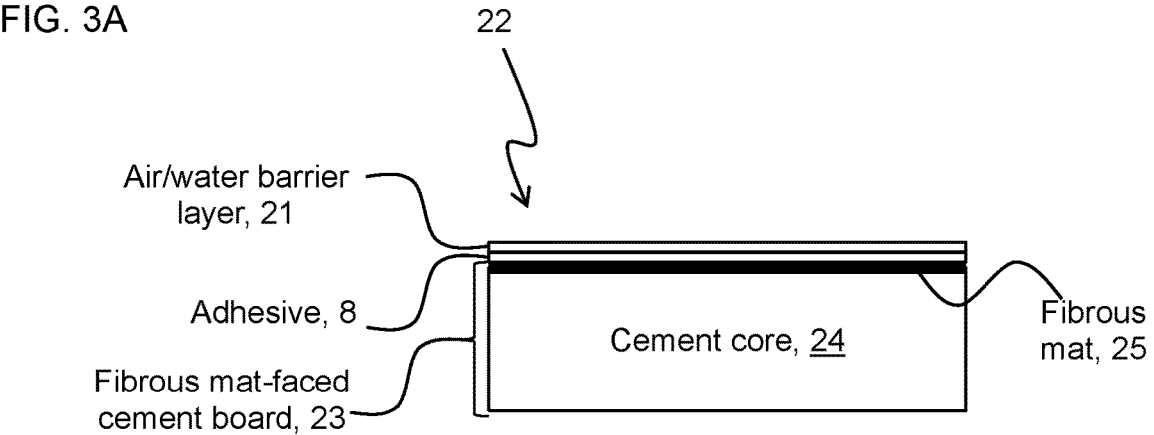
FIG. 3A shows a side cross sectional view of an example of an exterior sheathing panel of the present invention comprising a cement board with an air/water barrier sheet adhered to a surface of the cement board by being attached to a fibrous mat embedded in the cement core.

FIG. 3A shows a side cross sectional view of an example of an exterior sheathing panel of the present invention comprising a cement board 22 with an air/water barrier layer 21 adhered to a surface of the cement board 23 by being attached to a fibrous mat 25 embedded in the cement core 24. One way to make this is by the second method of the present invention described by the present specification which uses an air/water barrier sheet pre-made to have a barrier layer and a non-woven fiber layer, wherein the barrier layer is attached to the non-woven fiber layer by an adhesive layer.

Figure 3B:
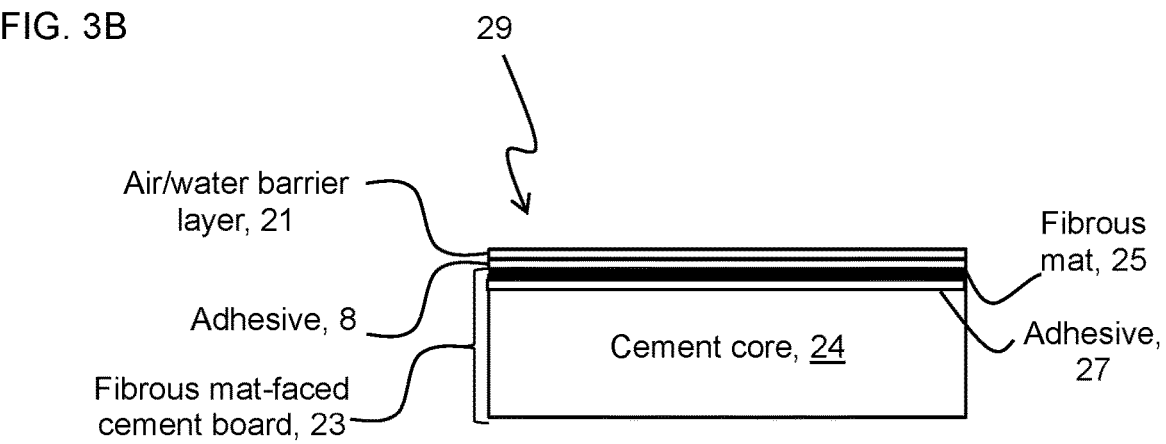
FIG. 3B shows a side cross sectional view of an example of an exterior sheathing panel of the present invention comprising a cement board with an air/water barrier sheet adhered to a surface of the cement board by being attached to a fibrous mat by a first adhesive layer, wherein the fibrous mat is attached by a second adhesive layer to the cement core.

FIG. 3B shows a side cross sectional view of an example of an exterior sheathing panel 29 of the present invention comprising a cement board with an air/water barrier layer 21 adhered to a surface of the cement core 24 by being attached to a fibrous mat 25 by a first adhesive layer 8, wherein the fibrous mat 25 is attached by a second adhesive layer 27 to the cement core 24. One way to make this is by the first method of the present invention described by the present specification which uses an air/water barrier sheet pre-made to have a barrier layer and a non-woven fiber layer, wherein the barrier layer is attached to the non-woven fiber layer by a first adhesive layer and the non-woven fiber layer is attached by a second adhesive layer to the cement core. A gypsum core may substitute for the cement core in FIG. 3B.

Figure 3C:
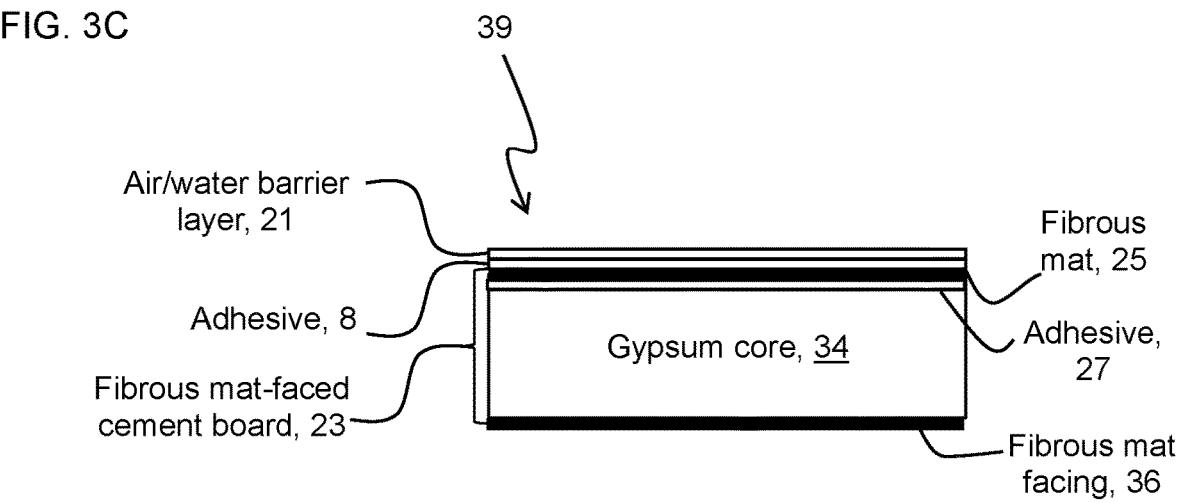
FIG. 3C shows a side cross sectional view of an example of an exterior sheathing panel of the present invention comprising a gypsum board with an air/water barrier sheet adhered to a surface of the gypsum board by being attached to a fibrous mat by a first adhesive layer, wherein the fibrous mat is attached by a second adhesive layer to the gypsum core.

FIG. 3C shows a side cross sectional view of an example of an exterior sheathing panel 39 of the present invention comprising a gypsum board with an air/water barrier layer 21 adhered to a surface of the gypsum core 34 by being attached to a fibrous mat 25 by a first adhesive layer 8, wherein the fibrous mat 25 is attached by a second adhesive layer 27 to the gypsum core 34. One way to make this is by the first method of the present invention described by the present specification which uses an air/water barrier sheet pre-made to have a barrier layer and a non-woven fiber layer, wherein the barrier layer is attached to the non-woven fiber layer by a first adhesive layer and the non-woven fiber layer is attached by a second adhesive layer to the cement core. A second fibrous mat facing 36 is also provided.

The fibrous mat-faced gypsum board of the present invention has an absence of paper at the faces of the fibrous mat-faced gypsum board. Preferably, the gypsum board of the present invention as a whole has an absence of paper as well as an absence of cellulose, particularly an absence of cellulose fibers.

Fibrous Mat Cover Sheets

Cover sheets comprising the fibrous mats are located at the faces of the fibrous mat-faced gypsum board of the present invention. The fibrous mat can comprise any suitable type of polymer fiber, mineral fiber, or combination thereof.

The choice of fibers will depend, in part, on the type of application in which the cementitious sheathing panel is to be used. For example, when the sheathing panel is used for applications that require heat or fire resistance, appropriate heat or fire resistant fibers should be used in the fibrous mat.

Mineral fibers are fibrous inorganic substances made primarily from rock, clay, slag, or glass. These fibers are classified into three general groups: fiberglass (glass wool and glass filament), mineral wool (rock wool and slag wool), and refractory ceramic fibers (RCF).

Examples of fiber materials suitable for use in the fibrous mat include, but are not limited to, glass fibers, polyamide fibers, polyaramide fibers, polypropylene fibers, polyester fibers (e.g., polyethylene terephthalate (PET)), polyvinyl alcohol (PVOH), polyvinyl acetate (PVAc), and combinations thereof. Preferably the fibers consist of coated or uncoated glass fibers (also known as coated or uncoated fiberglass).

The first fibrous mat can be woven or non-woven; however, non-woven mats are preferred. The non-woven mat typically has a small amount of binder homogeneously dispersed therethrough. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and the like, as well as combinations thereof. Suitable fibrous mats include commercially available mats used as facing materials for cementitious exterior sheathing panels.

Furthermore, the fibers of the mat can be hydrophobic or hydrophilic, coated or uncoated.

For purposes of the present specification the term "pre-coated non-woven glass fiber mat" typically is a mat having a binder coating of about 40 lbs/MSF to about 165 lbs/MSF, more preferably about 50 lbs/MSF to about 100 lbs/MSF, and most preferably about 61 lbs/MSF to about 75 lbs/MSF, wherein the coating uniformly penetrates the glass mat substrate from one side of the coated glass mat to a depth which is a fraction of the thickness of the coated glass mat. Thus, in addition to the at most small amount of substantially uniformly distributed polymer binder which an uncoated mat has, a pre-coated mat has an additional binder coating of polymer binder and inorganic filler applied to one side to penetrate at most partially through the thickness of the mat. Thus, a pre-coated non-woven glass fiber mat has one side coated with the binder coating and the other side uncoated to expose a raw glass fiber side. The term "pre-coated" is employed in the present specification where the non-woven glass fiber mat is coated with the binder coating before contacting a cementitious slurry that will become a core of a board.

When employing a pre-coated mat if a hydrophobic finish composition layer is also employed then the hydrophobic finish composition layer is adhered to the coated surface of the coated fibrous mat rather than the raw glass fiber side. The cementitious-based core is adhered to the raw glass fiber side.

A pre-coated mat differs from an uncoated mat. For example, an acrylic pre-coated glass mat differs from an "uncoated" glass mat using acrylic binder.

For purposes of the present specification an uncoated glass fiber mat is typically a glass fiber mat having an overall weight of 15-40 lbs/MSF and has at most a small amount of polymer binder substantially uniformly distributed, for example 19-27 wt % of the overall mat is polymer binder, but there is no inorganic filler. The thickness of an uncoated glass mat is typically 20-40 mil.

Also, a pre-coated mat is heavier than the uncoated mat. A pre-coated mat, in addition to the weight of the non-woven glass mat substrate, 40-165 lbs./MSF (pounds per thousand square feet) of binder coating is coated on one side of the non-woven glass mat substrate. The weight of the non-woven glass mat substrate prior to applying the binder coating is 10-50 lbs./MSF. Thus, after applying the binder coating to make the pre-coated glass mat the weight of this pre-coated glass mat is 50-215 lbs./MSF. Preferably the non-woven glass mat substrate before coating weighs between about 12 and about 50 lbs./MSF, more preferably about 14.5-26.5 lbs./MSF. Preferably 50-100 lbs./MSF, more preferably 61 to 75 lbs./MSF, of binder coating is coated on one side of the non-woven glass mat substrate. On average, the weight of the coated glass mat per unit area is no more than about six times the weight of the glass mat substrate prior to coating. The coating preferably also imparts a tensile strength to the coated glass mat which on average is at least 1.33 times greater than the tensile strength of the glass mat substrate without the coating.

The binder coating comprises binder polymer and inorganic filler. The binder coating is substantially uniformly distributed across the one side of the mat. Thus, the binder coating only partially permeates into the glass mat substrate. The other side exposes raw glass fibers coated at most with a small amount of binder polymer and no inorganic filler. The binder coating uniformly penetrates the glass mat substrate to a desired fractional thickness of the coated glass mat. The penetration of the binder coating into the glass mat substrate extends a depth of from 10% of a thickness of the coated glass mat to 75% of the thickness of the coated glass mat.

According to a preferred aspect of the invention, the first fibrous mat is not substantially embedded in the cementitious core. Preferably, less than about 50% of the thickness of the mat is embedded in the cementitious core, more preferably less than about 30%, less than about 15%, less than about 10%, or even less than about 2% (e.g., less than about 1%) of the thickness of the mat is embedded in the cementitious core. Without wishing to be bound by any particular theory, it is believed that the hydrophobic finish of the first fibrous mat prevents, to at least some degree, the first fibrous mat from becoming embedded in the cementitious core during production. In a related and preferred aspect of the invention, the cementitious core adheres, at least in part, to the hydrophobic finish.

It will be appreciated that the first fibrous mat has two facing surfaces: an outwardly facing surface and a surface facing the cementitious core. In accordance with the invention, the outwardly facing surface of the first fibrous mat facing the cementitious core comprises adhesive to which the air/water barrier sheet is attached. The inwardly facing surface need not comprise an air/water barrier sheet. However, if desired, the inwardly facing surface of the fibrous mat also can comprise an air/water barrier sheet as described herein. The inwardly facing surface of the fibrous mat can be otherwise treated by any method known in the art, or can remain untreated.

The fibrous mat-faced cementitious panel optionally can comprise a second fibrous mat comprising polymer or mineral fibers, wherein the cementitious core is disposed between the first fibrous mat and the second fibrous mat. The second fibrous mat can be the same or different from the first fibrous mat. The second fibrous mat is preferably the same as the first fibrous mat, both in material and orientation relative to the cementitious core, or has sufficiently similar expansion and contraction properties to the first fibrous mat, such that warping of the fibrous mat-faced cementitious panel is reduced or eliminated. When the second fibrous mat is the same as the first fibrous mat, it should be understood that the first and second fibrous mats can be provided by a single continuous piece of material, for example, by folding a single piece of fibrous mat such that it wraps around the cementitious core.

Cementitious Core

The cementitious core can comprise any material, substance, or composition containing or derived from hydraulic cement or calcium sulfate, along with any suitable additives. Hydraulic cements are also suitable cements. ASTM defines "hydraulic cement" as follows: a cement that sets and hardens by chemical interaction with water and is capable of doing so under water. There are several types of hydraulic cements that are used in the construction and building industries. Examples of hydraulic cements include Portland cement, slag cements such as blast-furnace slag cement and super-sulfated cements, calcium sulfoaluminate cement, high-alumina cement, expansive cements, white cement, and rapid setting and hardening cements. While calcium sulfate hemihydrate does set and harden by chemical interaction with water, it is not included within the broad definition of hydraulic cements in the context of this invention. All of the aforementioned hydraulic cements can be used to make the panels of the invention.

Non-limiting examples of materials that can be used in the cementitious core include hydraulic cements, calcium sulfate or mixtures thereof. Suitable hydraulic cements include any one of more of Portland cement, sorrel cement, slag cement, fly ash cement, calcium alumina cement. The most popular and widely used family of closely related hydraulic cements is known as Portland cement. ASTM defines "Portland cement" as a hydraulic cement produced by pulverizing clinker consisting essentially of hydraulic calcium silicates, usually containing one or more of the forms of calcium sulfate as an interground addition. To manufacture Portland cement, an intimate mixture of limestone, argallicious rocks and clay is ignited in a kiln to produce the clinker, which is then further processed. As a result, the following four main phases of Portland cement are produced: tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium alum inoferrite ($4CaO.Al_2O_3.Fe_2O_3$ or $C_4AF$). Other compounds present in minor amounts in Portland cement include calcium sulfate and other double salts of alkaline sulfates, calcium oxide, and magnesium oxide. Of the various recognized classes of Portland cement, Type III Portland cement (ASTM classification) is typically used for making the cement panels of the invention. The other recognized classes of hydraulic cements including slag cements such as blast-furnace slag cement and super-sulfated cements, calcium sulfoaluminate cement, high-alumina cement, expansive cements, white cement, rapidly setting and hardening cements such as regulated set cement and VHE cement, and the other Portland cement types can also be successfully used to make the cement panels of the present invention. The slag cements and the calcium sulfoaluminate cement have low alkalinity and are also suitable to make the cement panels of the present invention.

Suitable calcium sulfate material include any one or more of water-soluble calcium sulfate anhydrite, calcium sulfate alpha-hemihydrate, calcium sulfate beta-hemihydrate, natural, synthetic or chemically modified calcium sulfate hemihydrates, calcium sulfate dihydrate ("gypsum," "set gypsum," or "hydrated gypsum"), and mixtures thereof.

As used herein, the term "cement" or "cement material" refer to any of the forms of cement referenced above. As used herein, the terms "calcium sulfate" or "calcium sulfate material" refer to any of the forms of calcium sulfate referenced above.

Preferably, the cementitious core comprises a calcium sulfate material, Portland cement, or mixture thereof.

Typically a fibrous mat-faced cementitious panel useful in the present invention which is a gypsum panel comprises a cementitious core comprising greater than 75 weight % calcium sulfate dihydrate, typically at least 85 weight % calcium sulfate dihydrate, more typically at least 95 weight % calcium sulfate.

Typically the cement panel cementitious core which is a cement panel is made from an aqueous slurry containing 50 to 100 wt. % reactive powder on a dry (water free) basis, wherein the reactive powder comprises at least 10 weight percent set hydraulic cement and at most 75 wt. % calcium sulfate dihydrate, optionally the cement panel has a layer of scrim embedded into or on the surface of the set cementitious core. More typically a cementitious panel useful in the present invention is a cement panel comprising a cementitious core comprising at least 25 weight % cement, typically at least 40 weight % cement, and more typically at least 60 weight % cement.

Typically a fibrous mat-faced cementitious panel useful in the present invention having a cementitious core comprising calcium sulfate dihydrate and hydraulic cement is made from an aqueous mixture comprising as the reactive powder, on a dry (water free) basis, 25 to 75 wt. % calcium sulfate alpha hemihydrate, 10 to 75 wt. % hydraulic cement comprising Portland cement, preferably 35 to 75 wt. % (typically 45-65 or 55 to 65 wt. %) calcium sulfate alpha hemihydrate, 20 to 55 wt. % (typically 25-40 wt. %) hydraulic cement such as Portland cement.

A reinforced, lightweight, dimensionally stable structural cement panel (SCP), also known as a structural cementitious panel, is suitable as a panel for the present invention and employs a core of a continuous phase resulting from the curing of an aqueous mixture of calcium sulfate alpha hemihydrate, hydraulic cement, an active pozzolan and lime. The continuous phase is reinforced with alkali-resistant and glass fibers, typically being formed from an aqueous mixture having a weight ratio of water-to-reactive powder of 0.6/1 to 0.7/1 or a combination thereof. If desired the aqueous mixture composition may have a weight ratio of water-to-reactive powder of 0.4/1 to 0.7/1.

A preferred formulation for structural cement panels would comprise as the reactive powder, on a dry basis, 35 to 75 wt. % (typically 45-65 or 55 to 65 wt. %) calcium sulfate alpha hemihydrate, 20 to 55 wt. % (typically 25-40 wt. %) hydraulic cement such as Portland cement, 0.2 to 3.5 wt. % lime, and 5 to 25 wt. % (typically 10-15 wt. %) of an active pozzolan. The continuous phase of the panel would be uniformly reinforced with alkali-resistant glass fibers. Although the above compositions for the composite fiber-slurry mixture are preferred, the relative amounts of these ingredients, including the elimination of some of the above or the addition of others, may vary to suit the intended use of the final product. An example of a formulation for the composite slurry includes from 42 to 68 wt. % reactive powders, and 5 to 15 wt. % alkali-resistant glass fibers, based on the total dry ingredients.

U.S. Pat. No. 8,038,790 to Dubey et al provides another example of a preferred formulation for the composite slurry for use to make panels for the present invention which includes an aqueous mixture of a cementitious composition comprising, on a dry (water free) basis, 50 to 95 wt % reactive powder, 1 to 20 wt % of coated hydrophobic expanded perlite particles uniformly distributed as lightweight filler therein, the coated hydrophobic perlite particles having a diameter in the range of about 1 to 500 microns (micrometers), a median diameter, as measured on a volume size distribution basis, of 20 to 150 microns (micrometers) and an effective particle density (specific gravity) of less than about 0.50 g/cc, 0 to 25 wt % hollow ceramic microspheres, and 3 to 16 wt. % alkali-resistant glass fibers for uniformly distributed for reinforcement; wherein the reactive powder comprises: 25 to 75 wt. % calcium sulfate alpha hemihydrate, 10 to 75 wt. % hydraulic cement comprising Portland cement, 0 to 3.5 wt. % lime, and 5 to 30 wt. % of an active pozzolan; and the panel having a density of 50 to 100 pounds per cubic foot.

Although the above compositions for the composite fiber-slurry mixture are preferred, the relative amounts of these ingredients, including the elimination of some of the above or the addition of others, may vary to suit the intended use of the final product The additives for the cementitious core can be any additives commonly used to produce fibrous mat-faced cementitious panels, such as gypsum board or cement board. Such additives include, without limitation, structural additives such as mineral wool, continuous or chopped glass fibers (also referred to as fiberglass), perlite, clay, vermiculite, calcium carbonate, polyester, and paper fiber, as well as chemical additives such as foaming agents, fillers, accelerators, sugar, enhancing agents such as phosphates, phosphonates, borates and the like, retarders, binders (e.g., starch and latex), colorants, fungicides, biocides, and the like. Examples of the use of some of these and other additives are described, for instance, in U.S. Pat. Nos. 6,342,284, 6,632,550, 6,800,131, 5,643,510, 5,714,001, and 6,774,146, and U.S. Patent Publications 2004/0231916 A1, 2002/0045074 A1 and 2005/0019618 A1.

Advantageously, the cementitious core also comprises a hydrophobic agent, such as a silicone-based material (e.g., a silane, siloxane, or silicone-resin matrix), in a suitable amount to improve the water resistance of the core material. It is also preferred that the cementitious core comprise a siloxane catalyst, such as magnesium oxide (e.g., dead burned magnesium oxide), fly ash (e.g., Class C fly ash), or a mixture thereof. The siloxane and siloxane catalyst can be added in any suitable amount, and by any suitable method as described herein with respect the method of preparing a water-resistant fibrous mat-faced cementitious panel of the invention, or as described, for example, in U.S. Patent Publications 2006/0035112 A1 or 2007/0022913 A1. Desirably, the cementitious core also comprises strength-improving additives, such as phosphates (e.g., polyphosphates as described in U.S. Pat. Nos. 6,342,284, 6,632,550, and 6,800,131 and U.S. Patent Publications 2002/0045074 A1, 2005/0019618 A1, and 2007/0022913 A1) and/or pre-blended unstable and stable soaps (e.g., as described in U.S. Pat. Nos. 5,683,635 and 5,643,510). The cementitious core can comprise paper or glass fibers, but is preferably substantially free of paper and/or glass fibers (e.g., comprises less than about 1 wt. %, less than about 0.5 wt. %, less than about 0.1 wt. %, or even less than about 0.05 wt. % of paper and/or glass fibers, or contains no such fibers).

The cementitious board can be any of any type or shape suitable for the exterior sheathing panel of the present invention. Non-limiting examples of such cementitious boards include gypsum panels, cement panels and structural cement panels of any size and shape.

Adhesives

Application of the air/water barrier sheet made of low-permeability material can be achieved by laminating the low-permeability material sheet to the fibrous mat-faced cementitious panel using adhesive.

Examples of adhesives include, but are not limited to, sodium silicate adhesives, acrylic adhesives, acrylate adhesives, latex adhesives, thermoplastic adhesives, and combinations thereof. Typical adhesive is an Ethylene Vinyl Acetate (EVA) or a Polyvinyl Butyral (PVB). There is typically no calcium carbonate in the adhesive.

Preferably, the adhesive and low-permeability material sheet have a combined thickness of less than 2 mm (e.g., 0.05 mm to 2 mm), more preferably less than 1 mm, and even more preferably less than 0.5 mm, for example 0.2 mm.

For example, the present invention preferably uses adhesives that set or cross-link or which are adhesives which require heat to bond, e.g., hot-melt adhesives.

Suitable chemically curing adhesives are reactive materials that require chemical reaction to convert them from liquid (or thermoplastic) to solid. Once cured, these adhesives generally provide high strength, flexible to rigid bond lines that resist temperature, humidity, and many chemicals. Suitable non-reactive adhesives are drying type adhesives, pressure sensitive adhesives, contact adhesives, and hot melt adhesives, for example polyethylene hot melt adhesives. However, an advantage of the present invention is that it can use adhesives which are not pressure sensitive adhesives. Thus, for example the present invention can use adhesives that set or cross-link or adhesives which employ heat to bond, e.g., hot-melt adhesives.

Air/Water Barrier Sheet

The term "sheet" in the present disclosure is intended to refer to a distinct layer applied as a solid layer to a substrate. Thus, there is no phase change of the applied layer, for example no phase change from liquid to solid. This differs from a coating or membrane applied to a substrate as, for instance, a liquid or vapor which afterwards solidifies to form a layer on the substrate. The term "sheet" encompasses films, foils, and the like.

Thus, as used herein, the air/water barrier sheet is a general term that encompasses distinct layers of low-permeability material applied as films, foils, and the like. The low-permeability material sheet is a distinct sheet which is not an integrated sprayed-on membrane. Thus, the air/water barrier sheet is not a fluid applied membrane. It is adhered by a layer of adhesive to at least one fibrous mat-faced surface of the fibrous mat-faced cementitious panel. The air/water barrier sheet comprises low-permeability material sheet as a single layer sheet or a multi-layer sheet.

Examples of low-permeability material sheets include, but are not limited to, metal sheets (e.g., aluminum foil), coated metal sheets (e.g., coated aluminum foil), polymer sheets (e.g., polyethylene sheets like high-density polyethylene sheets), metalized polymer sheets, and combinations thereof. The low-permeability material sheet is preferably biaxially stretched polyethylene. Stretching the polyethylene polymer improves its vapor perm rating. Aluminum foil, even in very thin gauges, provides essentially a total water vapor and gas barrier if in perfect condition (no pinholes or imperfections). At thickness of 0.001 inch and above, aluminum foil is considered to be pinhole free. The barrier provided by aluminum foil will not significantly improve as the thickness of the foil is increased above 0.001 inch. However, other physical properties such a strength or tear resistance may improve.

The air/water barrier sheet comprises an air/water barrier layer which is the barrier portion of the barrier sheet that provides the perm rating. The air/water barrier sheet optionally has an air/water barrier sheet fibrous mat layer attached to the air/water barrier layer. The air/water barrier sheet fibrous mat, if present, comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose. Typically the fibers are polymer, e.g., polypropylene, fibers.

The polymer sheets may be a layer of essentially polymer, typically at least 90 wt. % polymer, more typically 95 to 100 wt % polymer, or may be a laminate of two or more such polymer layers. Or, the polymer sheets may be a laminate of one or more such polymer layers and one or more outer layers of non-woven fibers, for example polypropylene non-woven fibers. For example the waterproofing membrane may have a non-woven fibrous polymer mat layer held to a polymer layer by an adhesive layer.

The density of high-density polyethylene (HDPE) ranges from 930 to 970 kg/m$^3$. Although the density of HDPE is only marginally higher than that of low-density polyethylene (LDPE), HDPE has little branching, giving it stronger intermolecular forces and tensile strength than LDPE. The difference in strength exceeds the difference in density, giving HDPE a higher specific strength. It is also harder and more opaque and can withstand somewhat higher temperatures (120 C/248° F. for short periods). High-density polyethylene, unlike polypropylene, cannot withstand normally required autoclaving conditions. The lack of branching is ensured by an appropriate choice of catalyst (e.g., Ziegler-Natta catalysts) and reaction conditions.

The low-permeability material of the air/water barrier sheet can be any one of the foregoing or a multilayer sheet comprising any of the foregoing.

The air/water barrier sheet typically has an absence of calcium carbonate. The air/water barrier sheet typically has less than 30 wt. % vinyl, more typically an absence of vinyl.

A key property for barrier products is the permeance of the barrier. This value is typically reported in perms (1 grain of water evaporated per hour, per square foot per inch of mercury). Generally speaking for barrier products, there are four categories of moisture resistant barriers with the following ranges. A perm rating of 0.1 perms or less is considered a Class I impermeable vapor retarder (which is also considered a vapor barrier). A perm rating greater than 0.1 perms and less than or equal to 1.0 perms is considered a Class II semi-permeable vapor retarder. A perm rating greater than 1.0 perms and less than or equal to 10 perms is considered a Class III permeable vapor retarder. A perm rating greater than 10 is highly permeable and not considered to be a vapor retarder.

The air/water barrier sheet has a perm rating in the range of less than or equal to 0.15, preferably less than or equal to 0.1, the air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheet, or combinations thereof adhered by the layer of adhesive to the at least one fibrous mat-faced surface of the fibrous mat-faced cementitious panel, wherein the metal sheet and metal sheet of the coated metal sheet have a thickness between 0.0002 and 0.005 inches, typically 0.0002-0.003 inches.

The air/water barrier sheet provides the building exterior cementitious sheathing panel with the versatility to adjust and/or alter the water vapor permeance rate of the panel. The ability to adjust the water vapor permeance rate of an air- and moisture-resistant cementitious exterior sheathing panel, while retaining a consistent panel thickness is particularly beneficial, depending on the designed and/or intended performance of the exterior building envelope.

For example, the U.S. Department of Energy describes seven (7) climate zones. Each of the seven zones is based on the extent of heating degree days (HDD) and cooling degree days (CDD). These metrics are used to classify how severe the heating and cooling conditions are for buildings in different regions of the country. For example, Climate Zone 1 (South Florida) has CDD>9000 and building space conditioning is dominated entirely by cooling. Conversely, in an area like the upper Midwest located in Climate Zone 6, building energy use is dominated by heating loads, with HDD greater than 7200 and less than 9000. Moisture and humidity conditions must also be considered during the design process. Humidity considerations have a major impact on optimizing the energy systems within housing, often dictating which materials or systems work best in terms of both energy performance and moisture control. For instance, in hot and dry climates, evaporative cooling systems can provide the space cooling for homes; typically using less energy than traditional vapor compression A/C systems. Meanwhile, in areas like the hot/humid Southeast, special attention must be given to the vapor permeability of exterior wall assemblies to prevent serious moisture and mold problems in the building envelope. Hence, the need for different water vapor permeance rates relating to air and moisture-proof cementitious exterior sheathing panels is of importance.

The water vapor permeance rate can be modified by selecting the appropriate low-permeability material for the air/water barrier sheet to have a desired water vapor permeance rates.

Metal-Containing Air/Water Barrier Sheet

The air/water barrier sheet comprises any of a metal sheet (e.g., aluminum foil), coated metal sheet (e.g., coated aluminum foil), polymer sheet (e.g., polyethylene sheets like high-density polyethylene sheets), metalized polymer sheets, or combinations thereof adhered by a layer of adhesive to at least one fibrous mat-faced surface of the fibrous mat-faced cementitious panel The metal sheet is not provided for structural strength but rather for air/water impermeability. Typically the metal sheet is an aluminum foil having a thickness of 0.0002 and 0.005 inches, preferably 0.00025-0.002 inches, more preferably 0.00025-0.001 inches, typically 0.0002-0.003 inches. Optionally, this metal sheet, e.g., aluminum foil, has a tensile strength less than 20,000 pounds per square inch, preferably less than 10,000 pounds per square inch.

Because of its weakness, the aluminum foil may be supported on a fiber mesh or an additional polymer layer. The additional polymer layer typically has a thickness of 0.0001 to 0.020 inches, more preferably 0.001 to 0.010 inches. Likely the additional polymer layer is made of water based acrylic coating or epoxy type coating. Optionally the aluminum foil is pre-coated with polymer coated on by coating techniques such as roll coating, spray, gravure, screen printing, flood coating, knife, etc.

In the alternative, a polymer layer is made first and then sputter coated with aluminum. This sputtering is referred to as metalizing or vacuum deposition. Vacuum deposition is a family of processes used to deposit layers of material atom-by-atom or molecule-by-molecule on a solid surface. These processes operate at pressures well below atmospheric pressure (i.e., vacuum). The deposited layers can range from a thickness of one atom up to millimeters, forming freestanding structures. Multiple layers of different materials can be used, for example to form optical coatings. The process can be qualified based on the vapor source; physical vapor deposition uses a liquid or solid source and chemical vapor deposition uses a chemical vapor. Polymer sputter coated with aluminum is produced layer by layer as opposed to a polymer coated aluminum foil which is melt formed. This may result in polymer sputter coated with aluminum having slightly different atomic microstructures than polymer coated aluminum foil.

Additional low-permeability material sheet combinations could include coated aluminum foils, laminated aluminum foils, or aluminum/metalized polymer sheets for additional functionalities. Such functionalities can include material compatibility, sealant adhesion, external covering adhesion, durability or screw gasketing.

An additional benefit of a foil-coated fibrous mat exterior sheathing board would be that when utilized with the foil side facing the exterior can act as an effective thermal radiant barrier by reflecting radiant heat. This can reduce summer heat gain and thus reduce costs for cooling the building.

Polymer Air/Water Barrier Sheet

In some embodiments, an exterior sheathing panel with an integrated air/water barrier membrane comprises a membrane which comprises a pigment. Various pigments can be used, including chemical compounds that provide a black, brown, blue, green, red, yellow, orange or white pigment. If desired the polymer of the air/water barrier sheet includes suitable pH adjusters such as, but not limited to, at least one of the following: calcium hydroxide, sodium hydroxide, potassium hydroxide, 30% aqua ammonia and 2-Amino-2-methyl-1-propanol. These pH adjusters can be used in the amount 0.1% to 5% by weight.

A. Methods of Making a Fibrous Mat Faced Cementitious Panel

A.1. Making a Gypsum Board

The fibrous mat-faced cementitious panel can be prepared by any suitable method including, but not limited to, the inventive methods described herein. Methods of preparing the fibrous mat-faced cementitious panel according to the invention typically comprise (a) depositing a cementitious slurry on a first fibrous mat comprising polymer or mineral fibers, and (b) allowing the cementitious slurry to harden, thereby providing a fibrous mat-faced cementitious panel.

A typical method of preparing a fibrous mat faced cementitious gypsum panel suitable for the invention can be conducted on existing gypsum board manufacturing lines used to make fibrous mat-faced cementitious boards known in the art. Briefly, the process typically involves discharging a fibrous mat material onto a conveyor, or onto a forming table that rests on a conveyer, which is then positioned under the discharge conduit (e.g., a gate-canister-boot arrangement as known in the art, or an arrangement as described in U.S. Pat. Nos. 6,494,609 and 6,874,930) of a mixer. The components of the cementitious slurry are fed to the mixer comprising the discharge conduit, where they are agitated to form the cementitious slurry. Foam can be added in the discharge conduit (e.g., in the gate as described, for example, in U.S. Pat. Nos. 5,683,635 and 6,494,609).

The cementitious gypsum slurry can be deposited onto the fibrous mat facing material in accordance with known methods and on existing manufacturing lines for preparing a fibrous mat-faced cementitious panel. For instance, when the cementitious slurry is discharged onto the fibrous mat facing material, the slurry is spread, as necessary, over the fibrous mat facing material and optionally covered with a second facing material, which may be a fibrous mat or other type of permeable facing material (however preferably not paper). The wet cementitious assembly thereby provided is conveyed to a forming station where the article is sized to a desired thickness, and to one or more knife sections where it is cut to a desired length to provide a cementitious board. The fibrous mat-faced cementitious panel is allowed to harden, and, optionally, excess water is removed using a drying process (e.g., by air-drying or transporting the fibrous mat-faced cementitious panel through a kiln). Each of the above steps, as well as processes and equipment for performing such steps, are known in the art. It also is common in the manufacture of cementitious boards such as gypsum and cement board to deposit a relatively dense layer of slurry onto a facing material before depositing the primary slurry, and to use vibration in order to eliminate large voids or air pockets from the deposited slurry. Also, hard edges, as known in the art, are sometimes used. These steps or elements (dense slurry layer, vibration, and/or hard edges) optionally can be used in conjunction with the invention.

The cementitious gypsum slurry preferably does not substantially penetrate the first fibrous mat, thereby preventing the first fibrous mat from embedding in the cementitious slurry to any substantial degree. Preferably, the cementitious slurry penetrates 30-60% of the thickness of the mat, more preferably 40-60% of the thickness of the mat. According to a related and preferred aspect of the invention, the cementitious slurry preferably adheres, at least in part, to the adhesive layer which adheres the air/water barrier sheet to the panel.

Optionally, as mentioned above, the method of preparing a fibrous mat-faced cementitious gypsum panel can further comprise contacting the cementitious slurry with a second fibrous mat prior to allowing the cementitious slurry to harden, wherein the cementitious slurry is disposed between the first fibrous mat and the second fibrous mat. All other aspects of the first and second fibrous mats are as described with respect to the fibrous mat-faced cementitious panel of the invention.

The aspects of the method of preparing a fibrous mat-faced cementitious gypsum panel described herein apply to the fibrous mat-faced cementitious panel of the invention. Those aspects of the method of preparing a fibrous mat-faced cementitious gypsum panel not specifically described herein can be supplied by the techniques known and used in the manufacture of conventional fibrous mat-faced cementitious gypsum panel.

If desired to provide further water resistance to the fibrous mat-faced cementitious gypsum panel the method of making the fibrous mat-faced cementitious panel may further comprise (a) preparing an aqueous siloxane dispersion comprising about 4 wt. % to about 8 wt. % siloxane in water, and (b) combining the siloxane dispersion with the cementitious mixture to provide the cementitious slurry to be deposited onto a facing or other type of substrate, and subsequently allowed to harden, thereby providing the fibrous mat-faced cementitious panel.

Any siloxane suitable for conferring water-resistance to a cementitious mixture can be used. The siloxane can be a cyclic hydrogen-modified siloxane or, preferably, a linear hydrogen-modified siloxane. The siloxane is desirably a liquid (e.g., a siloxane oil). Typically, the linear hydrogen modified siloxanes useful in the practice of the present invention comprise those having a repeating unit of the general formula: —Si(H)(R)—O—, wherein R represents a saturated or unsaturated mono-valent hydrocarbon radical. In preferred embodiments, R represents an alkyl group and most preferably R is a methyl group. Preferred siloxanes are capable of forming highly cross-linked silicone resins. During polymerization, the terminal groups are removed by condensation and siloxane groups are linked together to form the silicone resin. Cross-linking of the chains also occurs. The resulting silicone resin imparts water resistance to the gypsum matrix as it forms. Suitable such siloxanes are commercially available and described in the patent literature.

The siloxane dispersion preferably is prepared by introducing the siloxane and water into a mixer in an amount sufficient to provide a dispersion comprising about 4 wt. % to about 8 wt. % siloxane in water, preferably about 4 wt. % to about 5 wt. % siloxane in water, and processing the mixture to produce a dispersion. More preferably, the dispersion comprises more than 4 wt. % and/or less than 8 wt. % siloxane in water. By way of illustration, the dispersion can comprise from about 4.1 wt. %, 4.2 wt. %, 4.3 wt. %, 4.4 wt. % or 4.5 wt. % to about 5 wt. %, 6 wt. %, or 7 wt. % siloxane in water. Preferably, the dispersion comprises droplets of siloxane in water, wherein the droplets have an average particle size of about 50 microns or less, preferably about 30 microns or less, or even about 20 microns or less (e.g., about 10 microns or less). More preferably, the droplets have a particle size distribution such that about 75% or more, 80% or more, 85% or more, even 90% or more, or even 95% or more of the droplets have a particle size of about 50 microns or less, preferably about 30 microns or less, or even about 20 microns or less (e.g., about 10 microns or less). The particle size and particle size distribution of the siloxane droplets in the dispersion can be determined using routine techniques, such as by dynamic light scattering analysis.

If desired, the dispersion is stabilized, such that the siloxane droplets remain dispersed in the water (i.e., the siloxane phase does not substantially separate from the water phase) for a period of time sufficient to allow the dispersion to be combined with the other components of the cementitious core. For instance, according to a preferred aspect of the invention, the dispersion will have a stability such that a sample of the dispersion taken immediately after mixing and allowed to rest will exhibit no visible coalescing of droplets on the surface of the sample within one minute (e.g., within two minutes).

A high shear or ultra-high shear mixer is, typically, used to disperse the siloxane in the water. The high shear or ultra-high shear mixer can be any mixer capable of producing a siloxane in water dispersion in which the siloxane droplets have the above-described particle size or particle size distribution characteristics. Suitable types of high shear mixers include mechanical-shear mixers, such as pin-type, blade-type, rotor-stator, and disc-type mixers, as well as hydraulic shear mixers. Preferred mixers are those capable of producing a tip-speed of about 9,000 to about 15,000 feet per minute (FPM) (or about 40 to about 80 meters per second (mps), such as about 10,000 to 12,000 FPM (or about 50 to about 60 mps).

The siloxane and water can be introduced into the dispersing mixer, preferably high shear mixer, separately or together, simultaneously or sequentially in any order. When the dispersion is prepared by batch mixing, the water is preferably added prior to the siloxane. However, batch mixing generally is not convenient or economical for continuous production methods. Thus, an in-line dispersing mixer is preferably used so as to produce the dispersion in a continuous manner, in which case the siloxane and water can be supplied to the in-line dispersing mixer continuously and simultaneously in an appropriate ratio. The aqueous siloxane dispersion preferably does not comprise an emulsifier or dispersant.

The aqueous siloxane dispersion is combined with a cementitious mixture to provide a cementitious slurry. Those of ordinary skill in the art will appreciate that the cementitious mixture comprises solid components and liquid components. By way of illustration, the siloxane dispersion comprising the above-described amount of siloxane in water can be introduced directly into the mixer (e.g., the board mixer) comprising the solid components and/or liquid components of the cementitious mixture. Preferably, however, the siloxane dispersion is first combined with a liquid component of the cementitious mixture (e.g., water), and subsequently combined with the solid components of the cementitious mixture (e.g., by adding the siloxane dispersion to the gauging water or other water that is subsequently delivered to the board mixer). The siloxane dispersion is preferably added to the cementitious mixture in an amount sufficient to provide a siloxane content in the final cementitious product of about 0 to 20 wt. %, preferably 3 to 7 wt. %.

The cementitious slurry optionally comprises a siloxane catalyst, such as fly ash, especially class C fly ash, magnesium oxide, especially dead burned magnesium oxide, or, most preferably, a combination thereof. The fly ash is preferably used in amounts of about 0.1% to about 5% based on the weight of the dry cementitious component (e.g., the dry weight of the stucco). The magnesium oxide is preferably used in amounts of about 0.1% to about 0.5% based on the weight of the dry cementitious component (e.g., the dry weight of the stucco). The ratio of fly ash to magnesium oxide is desirably from about 2:1 to about 3:1.

Other aspects of preparing an aqueous siloxane emulsion and combining the emulsion with cementitious slurry are as described in U.S. Patent Publication 2007/0022913 A1.

A.2. Making a Cement Board

A cement board having a cementitious core of homogeneous cementitious composition from face to face and having a substantially uniform thickness with bare surfaces and a mesh of reinforcing fibers underlying at least one side of a top or bottom surface of the cementitious core is made continuously by distributing a sole cementitious composition on a moving carrier sheet and smoothing the surface by rotating a cylindrical roller in a direction counter to the movement of the carrier sheet. A network of reinforcing fibers is pressed against the surface of the underlying carrier sheet by the weight of the cementitious composition. A vertical gap between the sheet and the network is created so that the cementitious composition may penetrate the voids of the network and spread out on the underlying sheet to embed the fibers. If desired, an upper reinforcing network is submerged under the surface by feeding it under the counter rotating roller. Typically the mesh of reinforcing fibers underlies the top, bottom, and longitudinal side edge of the cement board. Typical cement board making processes are disclosed by U.S. Pat. No. 4,450,022 to Galer, U.S. Pat. No. 4,488,917 to Porter et al., U.S. Pat. No. 4,504,335 to Galer, and U.S. Pat. No. 4,916,004 to Ensminger et al.

A.3. Making a Structural Cement Panel (Also Known as Structural Cementitious Panel)

Methods and apparatus to make the type of cement board known as a structural cement panel are disclosed by the following published US patent applications, all incorporated by reference in its entirety:

United States Patent Application Publication No. 2018/0036911 A1 to Dubey et al, entitled CONTINUOUS MIXER AND METHOD OF MIXING REINFORCED FIBERS WITH CEMENTITIOUS MATERIALS;

United States Patent Application Publication No. 2018/0036909 A1 to Dubey et al, entitled HEADBOX AND FORMING STATION FOR FIBER REINFORCED CEMENTITIOUS PANEL PRODUCTION;

United States Patent Application Publication No. 2018/0036693 A1 to Dubey et al, entitled a METHOD FOR PRODUCING FIBER REINFORCED CEMENTITIOUS SLURRY USING A MULTI-STAGE CONTINUOUS MIXER; and United States Patent Application Publication No. 2018/0036912 A1 to Dubey et al, entitled CONTINUOUS METHODS OF MAKING FIBER REINFORCED CONCRETE PANELS; and United States Patent Application Publication No. 2018/0036912 A1 to Dubey et al entitled CONTINUOUS METHODS OF MAKING FIBER REINFORCED CONCRETE PANELS.

In particular, US 2018/0036912 A1 to Dubey et al discloses a continuous method including: mixing water and cementitous powder to form slurry; mixing the slurry and reinforcement fibers in a single pass horizontal continuous mixer to form fiber-slurry mixture, the mixer including an elongated mixing chamber having a reinforcement fiber inlet port, and upstream of the fiber inlet port is an inlet port to introduce water and cementitous powder together as one stream or at least two inlet ports to introduce water and dry cementitous powder separately as separate streams into the chamber, a rotating horizontal shaft/s within the chamber, part of the chamber for mixing the fibers and slurry and moving the fiber-slurry mixture to a mixture outlet; discharging the fiber-slurry mixture from the mixer outlet; forming and setting the fiber-slurry mixture on a moving surface; cutting the set mixture into fiber reinforced concrete panels and removing the panels from the moving surface.

B. Applying the Air/Water Barrier Sheet to Construct the Exterior Sheathing Panels B.1. Applying Downstream of Manufacturing the Cementitious Panel A first method of making exterior sheathing panel from a gypsum panel or a cement panel after the gypsum panel or a cement panel is made. This comprises the following steps:

providing a cementitious panel comprising a cementitious core selected from a gypsum panel comprising a gypsum panel core layer, wherein the gypsum panel core layer comprises greater than 75 weight % calcium sulfate dihydrate, typically at least 85 weight % calcium sulfate dihydrate, more typically at least 95 weight % calcium sulfate dihydrate, and a gypsum panel fibrous mat attached as a cover sheet to the gypsum panel core layer, wherein the gypsum panel fibrous mat comprises at least one of polymer fibers, glass fibers, mineral fibers or a combination thereof, wherein the gypsum panel fibrous mat has an absence of paper fibers, and wherein the gypsum panel fibrous mat has an absence of cellulose, or a cement panel comprising a cement panel core layer, wherein the cement panel cementitious core is made from an aqueous mixture containing 50 to 100 wt. % reactive powder on a dry (water free) basis, wherein the reactive powder comprises at least 10 weight percent set hydraulic cement and at most 75 wt. % calcium sulfate dihydrate, providing an air/water barrier sheet which overlays the cementitious panel and is attached to the cementitious panel, wherein the air/water barrier sheet comprises an air/water barrier layer, wherein the air/water barrier sheet optionally has an air/water barrier sheet fibrous mat layer attached to the air/water barrier layer, wherein the air/water barrier sheet fibrous mat, if present, comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose, locating an adhesive layer between the cementitious panel and the air/water barrier layer, wherein the adhesive layer attaches an entire surface of a side of the air/water barrier sheet to the gypsum panel fibrous mat on a side of the gypsum panel facing the air/water barrier sheet, or wherein the adhesive layer attaches an entire surface of a side of the air/water barrier sheet to a side of the cement panel facing the air/water barrier sheet, or wherein the adhesive layer attaches an entire surface of a side of the air/water barrier layer to the air/water barrier sheet fibrous mat layer when the air/water barrier sheet fibrous mat layer is embedded in the cement core layer, wherein each respective said air/water barrier sheet is individually attached to only a single respective said cementitious panel, wherein each respective said air/water barrier sheet entirely covers a side of the respective cementitious panel, wherein the air/water barrier sheet has a perm rating in the range of less than or equal to 0.15, preferably less than or equal to 0.1, the air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheet, or combinations thereof adhered by the layer of adhesive to the at least one fibrous mat-faced surface of the fibrous mat-faced cementitious panel, wherein the metal sheet and metal sheet of the coated metal sheet have a thickness between 0.0002 and 0.005 inches, typically 0.0002-0.003 inches, wherein the perm rating is according to a desiccant method with Procedure A of ASTM E96 (2016).

Thus, before applying the air/water barrier sheet, the fibrous mat-faced cementitious panel has been cut to size on a panel manufacturing line. Thus, after applying the air/water barrier sheet, the fibrous mat-faced cementitious panel is suitable for shipping to a building site.

The coating of at least one entire surface of at least one of the cementitious panel or the air/water barrier sheet with the layer of adhesive may be by spray coating, roll coating or flood coating to provide at least one said adhesive layer suitable to be located between the cementitious panel and the air/water barrier sheet.

Thus, in the first method the layer of adhesive may be applied to the fibrous mat on the fibrous mat-faced cementitious panel having the set cementitious core to form a laminate having the adhesive layer; and then the air/water barrier sheet is applied to contact the adhesive layer on the fibrous mat on the side of the fibrous mat-faced cementitious panel.

Preferably the adhesive is uncured (not cross-linked) while deposited on the first fibrous mat, not cured while applying the air/water barrier sheet to the adhesive layer on the fibrous mat-faced cementitious panel, and is then allowed to cure after applying the air/water barrier sheet to the adhesive layer on the fibrous mat-faced cementitious panel.

In the first method for making exterior sheathing panel from gypsum panels and cement panels the layer of adhesive may be applied to the air/water barrier sheet to form a laminate having the adhesive layer. Then the laminate is applied to the cementitious panel having the set cementitious core to contact the adhesive layer with the fibrous mat on the side of the fibrous mat-faced cementitious panel, wherein if the adhesive is applied to the side of the gypsum panel the adhesive is applied to at least one said fibrous mat cover sheet. This includes a lamination process involving applying a layer of uncured adhesive to one side of the air/water barrier sheet, and then applying the adhesive coated air/water barrier sheet to the surface of the cementitious panel while the adhesive is still uncured. The adhesive coated air/water barrier sheet is then pressed against the cementitious panel to smooth out any wrinkles in the air/water barrier sheet and to ensure that the adhesive layer is well bounded to the surface of the cementitious panel. The laminated cementitious panel is then held at room temperature to permit the adhesive to cure. The cementitious panel and air/water barrier sheet are both held at room temperature during the lamination process to reduce the risk of shrinkage during the curing period. The curing period will depend on the adhesive used, but for most water based ethylene vinyl adhesives, the curing period will be several minutes.

Thus, the adhesive is typically uncured (not cross-linked) while applying a layer of uncured adhesive to one side of the air/water barrier sheet, not cured while applying the adhesive coated air/water barrier sheet to the surface of the fibrous mat-faced cementitious panel, and is then allowed to cure after applying the air/water barrier sheet to the adhesive layer on the fibrous mat-faced cementitious panel.

The lamination process is typically carried out in a laminating machine. Laminating machines are readily available in the marketplace. These laminating machines would typically apply the adhesive to one side of a continuous roll of air/water barrier sheet and then press the coated air/water barrier sheet to the wall panel via a series of rollers.

In the alternative in the first method, the layer of adhesive is applied to the side of the cementitious panel, wherein if the adhesive is applied to the side of the gypsum panel the adhesive is applied to at least one said fibrous mat cover sheet.

B.2. Applying the Air/Water Barrier while Manufacturing the Cementitious Panel Having a Cement Panel Core In a second method for making exterior sheathing panels having a cement panel core, comprising set hydraulic cement and optionally a layer of scrim embedded into or on the surface of the cement core, the air/water barrier layer is applied during manufacture of the cement panel. This method employs the air/water barrier laminated by an adhesive layer to a first fibrous mat. Then the cementitious slurry is deposited on the laminated first fibrous mat in the manufacturing line for the exterior sheathing panels. This method is preferably employed for cement panels having an embedded scrim, or cement panels having embedded reinforcing fibers, for example structural cement panels.

This method of making exterior sheathing panel having the cement panel cementitious core, for example wherein the cement panel cementitious core is made from an aqueous slurry containing 50 to 100 wt. % reactive powder on a dry (water free) basis, wherein the reactive powder comprises at least 10 weight percent set hydraulic cement and at most 75 wt. % calcium sulfate dihydrate, optionally the cement panel has a layer of scrim embedded into or on the surface of the set cementitious core, comprises the following steps:

providing an air/water barrier sheet comprising an outer layer of an air/water barrier sheet fibrous mat layer attached to an air/water barrier layer, wherein the air/water barrier sheet fibrous mat (typically non-woven) comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose, feeding the air/water barrier sheet onto a moving surface of the manufacturing line with the fibrous mat facing up away from the moving surface, optionally feeding the scrim to overlay the air/water barrier sheet fibrous mat facing up away from the moving surface;

then depositing the aqueous mixture on the air/water barrier sheet fibrous mat and optionally on the scrim while the air/water barrier sheet and optional scrim are moving on the moving surface, wherein the aqueous mixture penetrates the fibrous mat and if the optional scrim is present, embeds the optional scrim, and then allowing the aqueous mixture to set (harden) to form a panel precursor and cutting the panel precursor to a desired length to form the exterior sheathing panels having the cement panel core, wherein each respective said air/water barrier sheet is individually attached to only a single respective said cementitious panel, wherein each respective said air/water barrier sheet entirely covers a side of the respective cementitious panel, wherein an adhesive layer is located between the cementitious panel and the air/water barrier layer, wherein the adhesive layer attaches an entire surface of a side of the air/water barrier layer to the air/water barrier sheet fibrous mat layer when the air/water barrier sheet fibrous mat layer is embedded in the cement core layer, wherein each exterior sheathing panel has one said air/water barrier sheet attached to only a single respective said cementitious panel, wherein each respective said air/water barrier sheet entirely covers a side of the respective cementitious panel, wherein the air/water barrier sheet has a perm rating in the range of less than or equal to 0.15, preferably less than or equal to 0.1, the air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheet, or combinations thereof adhered by the layer of adhesive to the at least one fibrous mat-faced surface of the fibrous mat-faced cementitious panel, wherein the metal sheet and metal sheet of the coated metal sheet have a thickness between 0.0002 and 0.005 inches, typically 0.0002-0.003 inches, wherein the perm rating is according to a desiccant method with Procedure A of ASTM E96 (2016).

Where laminate fibrous mat-air/water barrier sheet is used on only one side of the board, as a result each board will have a respective single sheet of the composite air/water barrier-non-woven fibrous mat sheet on one side of the board.

Typically the provided an air/water barrier sheet comprising an outer layer of an air/water barrier sheet fibrous mat layer attached to an air/water barrier layer. A pre-made laminate fibrous mat-air/water barrier sheet is made prior to feeding to the board manufacturing line. Thus, for example, it can be made in a different manufacturing facility and shipped to the facility for manufacturing the board or it can be made is a separate manufacturing line at the same facility where the board is manufactured.

For example, if using a pre-made laminate fibrous mat-air/water barrier sheet for making a cement panel having laminate fibrous mat-air/water barrier sheet on one side of the panel, the bottom composite air/water barrier-non-woven fibrous mat sheet is used as the forming plate and fed to a panel manufacturing line. Typically the fibrous mat is non-woven. Afterwards a scrim is optionally fed to the panel manufacturing line to overlay the bottom laminate fibrous mat-air/water barrier sheet. Then cement slurry is deposited over the bottom laminate fibrous mat-air/water barrier sheet and optional scrim to embed the scrim and penetrate the non-woven fiber layer of the laminate fibrous mat-air/water barrier sheet. Afterwards an optional second (upper) scrim is fed into the manufacturing line. Then the optional second (upper) scrim is pressed into the cement slurry to embed the optional second (upper) scrim into the cement slurry. Thus, the cement slurry will be able to penetrate into the non-woven fabric of the laminate fibrous mat-air/water barrier sheet and bond to the non-woven fabric of the laminate fibrous mat-air/water barrier sheet. After the cement board is formed, the panels will go into a kiln followed by a normal curing period. As a result each board will have its own respective single sheet of the composite air/water barrier-non-woven fibrous mat sheet on one side of the board.

In a method of using pre-made laminate fibrous mat-air/water barrier sheets for making a cement panel having laminate fibrous mat-air/water barrier sheet on both sides of the panel, the bottom laminate fibrous mat-air/water barrier sheet is used as the forming plate and fed to a panel manufacturing line. Afterwards a first scrim is optionally fed to the panel manufacturing line to overlay the bottom composite air/water barrier-non-woven fibrous mat sheet. Then a cement slurry is deposited over the bottom laminate fibrous mat-air/water barrier sheet and optional first scrim to embed the scrim and penetrate the non-woven fiber layer of the laminate fibrous mat-air/water barrier sheet. The top laminate fibrous mat-air/water barrier sheet is fed into the line after a optional second (upper) scrim. Then the upper laminate fibrous mat-air/water barrier sheet and optional second (upper) scrim are pressed into the cement slurry to embed the scrim and penetrate the non-woven fiber layer of the laminate fibrous mat-air/water barrier sheet. Thus, the cement slurry will be able to penetrate into the non-woven fabric of the laminate fibrous mat-air/water barrier sheet and bond to the non-woven fabric of the laminate fibrous mat-air/water barrier sheet. After the cement board is formed, the panels will go into a kiln followed by a normal curing period. As a result each of two opposed sides of each board will have its own respective single sheet of laminate fibrous mat-air/water barrier sheet.

System

In another aspect, the present disclosure is directed to a system comprising framing to which is attached at least one exterior sheathing panel of the invention which prevents water penetration and air leakage. In particular, the invention provides an exterior sheathing panel comprising (a) a fibrous mat-faced cementitious panel comprising a cementitious core, and at least one fibrous mat comprising polymer or mineral fibers and (b) an air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheets, or combinations thereof adhered by a layer of adhesive to at least one fibrous mat-faced surface of the fibrous mat-faced cementitious panel, wherein the air/water barrier exteriorly faces away from the framing. The laminated foil comprising any of a layer of aluminum foil, a layer of aluminum foil attached to a layer of polymer, or a layer of polymer onto which was sputtered a layer of aluminum. The layer of polymer is typically polyacrylate, polyurethane, silicone emulsion, polystyrene, styrene/acrylic co-polymers and combinations thereof. The layer of polymer typically has an absence of calcium carbonate. The product would be used on the exterior of a building to provide an impermeable water/air barrier and radiant thermal barrier.

Any of the integrated panels described herein can be part of a system that includes an integrated panel that is adhered to one or more wall studs or ceiling joists via a fastener (e.g., a screw, a nail) with the integrated air/water barrier membrane as an outward facing material. Two adjacent panels are joined at the seams using a suitable joint tape and joint compound. If desired, an additional flashing layer can be added as a further air and water barrier. A cladding material (e.g., siding, shingle, stone) is further adhered to the exterior facing surface of the integrated panel. The entire system is designed to prevent the penetration of air and water through the panel to the interior of the structure.

Figure 4:
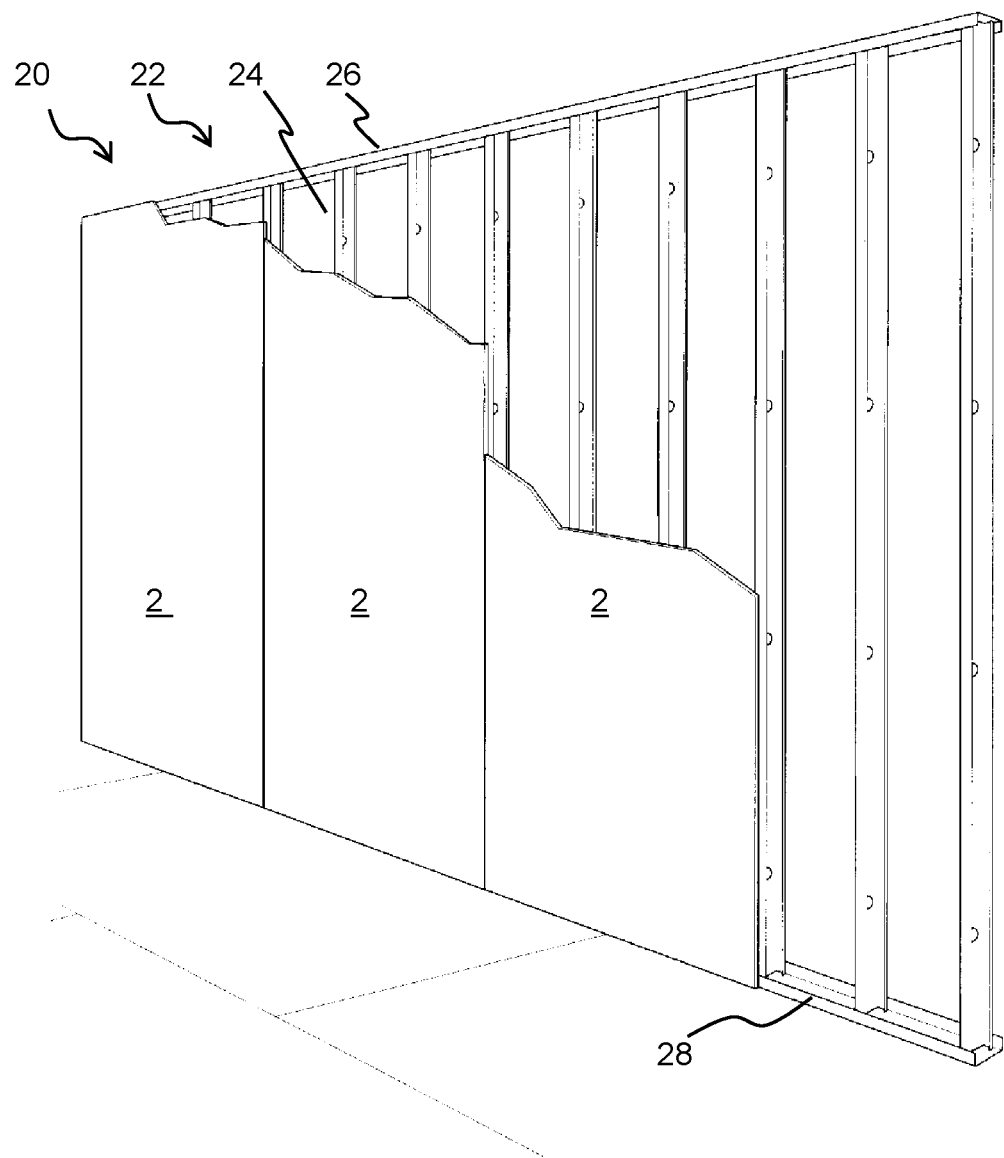
FIG. 4 shows a perspective view of an exterior sheathing panel of the present invention attached to one side of a metal stud wall suitable in the exterior wall system of the present invention, wherein the exterior sheathing panel comprising a cementitious board with an air/water barrier sheet adhered to a surface of the cementitious board.

FIG. 4 is a perspective view of a typical exterior sheathing system 20 that may be employed in the present exterior wall system. FIG. 4 shows an exterior sheathing panel 2 of the present invention attached to one side of a metal stud wall suitable in the exterior wall system of the present invention, wherein the exterior sheathing panel includes a cementitious panel selected from a gypsum panel or a cement panel with an air/water barrier sheet adhered to a surface of the cementitious panel (for example a panel of FIG. 2 or FIG. 3). FIG. 4 shows metal stud wall "skeleton" 22 which includes a plurality of metal studs 24, an upper track 26, a lower track 28. Sheathing panels 2 may be secured in any known manner to one or both sides of the metal studs 24 to close the wall and form the exterior surface or surfaces of the wall. A typical metal stud wall "skeleton" may be fabricated according to U.S. Pat. No. 6,694,695 to Collins et al., incorporated herein by reference, which is suitable for combination with an exterior sheathing panel to achieve an exterior wall system of the present invention. This metal frame system is merely provided as illustrative as other metal frames may also be employed. Or a wood frame may be employed.

In the system the exterior sheathing panels are typically attached to the framing by any one or more of screws, nails, or glue. Also, in the system the exterior sheathing panel typically has no perforations except for perforations made by the screws or nails.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless otherwise specified all percentages, ratios and average molecular weights are on a weight basis.

Example 1

The following example illustrates a fibrous-mat faced cementitious article in accordance with the invention. The panels were prepared for the testing as follows:

The gypsum panel baseboard used was a ¼" thick, 12" wide×24" long, coated glass-mat board made from setting an aqueous gypsum slurry mixture having over 95 wt. % stucco (calcium sulfate hemihydrate) on a dry (water free) basis.

The barrier sheet was 20# Natural Kraft/000285 Foil Duplex laminated foil facer. This barrier sheet had three layers, namely a layer of aluminum foil approximately 0.000285 inches thick, a Kraft paper layer, and an adhesive layer between the foil and paper layers to attach the foil and paper layers to each other. This was a proof of concept Example as the invention would use a non-paper layer, e.g., a polymer layer, rather than a Kraft Paper layer.

Figure 5:
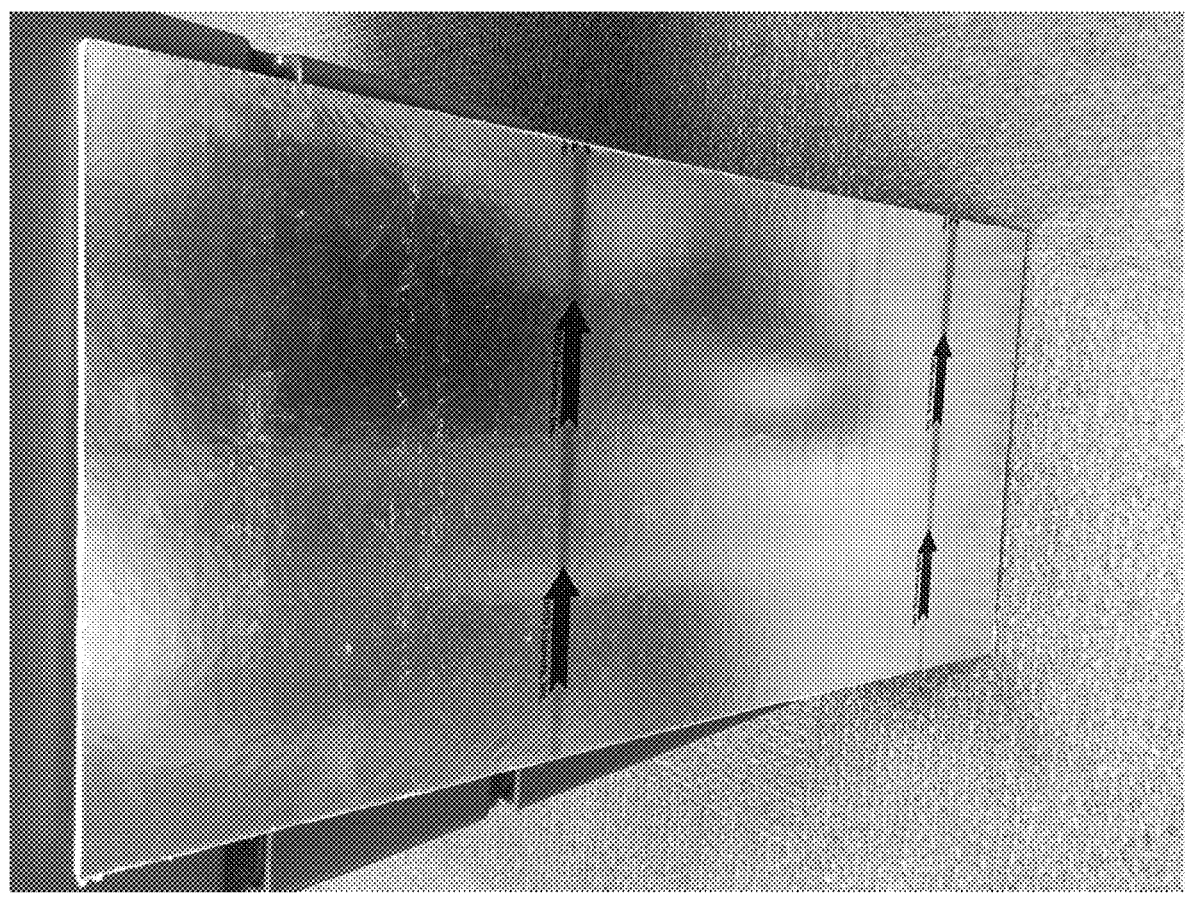
FIG. 5 shows a photograph of a panel tested in an Example.

A synthetic elastomer-based adhesive was used to laminate the foil facer to the gypsum panel. The adhesive was applied by spraying to the foil facer (paper backside face) and the gypsum coated mat face, allowed to tack, and then the two pieces were joined and a wide joint knife was used to smooth out the composite panel. The composite was then dried in a lab oven at 110° F. for two hours. FIG. 5 shows a photograph of a composite panel prepared as described above and tested for this example.

For purposes of the present specification the units of perm is defined by the International Residential Code as that measured using the desiccant method with using the desiccant method with Procedure A of ASTM E96 (2016). The Examples we performed were in accordance with this procedure as well.

In the Examples the water vapor permeance measurements were made according to ASTM E 96 (2016), Standard Test Methods for Water Vapor Transmission of Materials. Dry cup measurements were performed. Specimens analyzed were cut to 33.18 cm2 in area. They were sealed with wax to the openings of metal cups. The cups contained silica gel desiccant that had been baked at 400° F. (204° C.) (to provide near 0% RH inside the cup). The air space between the specimen and the desiccant was maintained at about 0.25 inch. The cups were placed in an environmental chamber with an automated weighing system. The interior of the environmental chamber was maintained at 73.4° F. (23° C.) and at a relative humidity of 50%. Each cup was weighed periodically, over seven days. Plots of mass versus time for the cup/specimen assemblies were done using the measured data. Selected portions of the plots were fitted to linear equations, and the slopes were used with the cup opening and the inside-outside relative humidity (RH) difference to calculate the permeance of the specimen, as given in the ASTM E96 (2016). At least six data points were used to obtain the slopes.

Three samples obtained from this testing had an average perm rating of 0.13 perms for the total structure tested.

Example 2—Cement Board

This example employed a composite air/water barrier-non-woven fibrous mat sheet including an oriented high density polyethylene (HDPE), cross-laminated core waterproof barrier sheet complying with ANSI A118.10 (TABLE 1). This sheet in thickness as thin as 12 mil has a very low perm rating of 0.023 perm when tested in accordance with ASTM E96 (2016) procedure E (100° F. and 90% relative humidity) to have the <0.1 perm rating of an impermeable water/air barrier.

ASTM E96 (2016) Procedure E referred to in TABLE 1 is the desiccant method at 100° F., 90% RH. ASTM E96 (2016) Procedure E differs from ASTM E96 (2016) Procedure A cited elsewhere in this specification which is the desiccant method at 73.4° F., 50% Relative Humidity (RH). The waterproofness test referred to in TABLE 1 is very similar to the water resistance test described in AATCC 127, for water/air barrier.

TABLE 1

ANSI A118.10 (2014) and ASTM E96-16 (2016) testing results for composite air/water barrier-non-woven fibrous mat sheet

| | Reference | Test method | Requirement | composite air/water barrier-non-woven fibrous mat sheet |
|---|---|---|---|---|
| Thickness (mil) | | | | 12 |
| Fungus and Micro-Organism Resistance | ANSI A118.10 | ANSI A118.10 | Not supporting mold growth | Pass |
| Seam strength (lb/in) | ANSI A118.10 | ASTM D751-06 (2011) | >8 | 20 |
| Breaking strength (psi) | ANSI A118.10 | ASTM D751-06 (2011) | >170 psi | 1914 |
| Dimensional stability (%) | ANSI A118.10 | ASTM D1204-14 | <±0.7 | −0.4 at 158° F. −0.1 at −15° F. |
| Waterproofness | ANSI A118.10 | ASTM D4068-17 | Pass | Pass |
| Vapor permeability (perm) | | ASTM E96-16 (procedure E, 100° F. and 90% RH) | | 0.023 |

The tested composite air/water barrier-non-woven fibrous mat sheet was a 7-layer composite (including laminate/adhesive layers). It has a layer of nonwoven polypropylene (PP) laminated to each side with a polyethylene (PE) resin adhesive layer for a total of 7 layers. The oriented single plies are laminated with the orientation directions crossed at approximately 90° and approximately 45° from the machine direction to provide tear resistance and toughness. TABLE 2 shows the 7-layer composite construction.

TABLE 2

Structure of the 7-layer composite air/water barrier-non-woven fibrous mat sheet Outer Layer of non-woven Polypropylene
Adhesive Layer of Polyethylene resin
Laminate Layer of Oriented single ply high density polyethylene
Laminate Layer of Polyethylene
Laminate Layer of Oriented single ply high density polyethylene
Adhesive Layer of Polyethylene resin
Outer Layer of non-woven Polypropylene A board of nominal half inch thickness was made by making an aqueous cement slurry and applying to it the composite air/water barrier-non-woven fibrous mat sheet to contact the aqueous cement slurry with the Outer Layer of non-woven Polypropylene in a mold. The cement slurry penetrated the Outer Layer of non-woven Polypropylene and embedded the scrim. The scrim and air/water barrier was applied on both sides of the cement board. Thus, a layer of scrim and a layer of composite air/water barrier-non-woven fibrous mat sheet were also applied to the opposite side of the aqueous slurry. The cement slurry penetrated the Outer Layer of non-woven Polypropylene of this composite air/water barrier-non-woven fibrous mat sheet and embedded the scrim and formed good bonds. After the cement board was formed it was dried in a kiln. TABLE 3 shows the formulation for the aqueous cement slurry for the cement board made in this example.

TABLE 3

Formulation for cement board

| | Weight (lb/1000 ft$^2$) |
|---|---|
| Type III portland cement | 779 |
| Class C fly ash | 195 |
| Gypsum | 78 |
| Expanded clay aggregate | 684 |
| Perlite | 68 |
| Water | 611 |
| Triethanolamine | 3.06 |
| Trisodium trimetaphosphate | 1.04 |
| Sodium citrate | 2.08 |
| DURSAR (naphthalene sulfonate) | 3.9 |

In practice to make a cement board the air/water barrier can be applied to one or both sides. If used on both sides the bottom membrane is used as the forming plate, and fed to the line before the scrim. The top membrane is fed into the line after the top scrim. The cement slurry embeds the scrim and penetrates into the non-woven fabric of the membrane to bond the non-woven fabric to the cement board. After forming the cement board, the board will go into a kiln for drying followed by curing and cutting. This product configuration requires only small adjustments to existing cement board lines.

Example 3

The product configuration of this example uses the aqueous cement slurry of TABLE 3 and a composite air/water barrier-non-woven fibrous mat sheet including a barrier layer made of high modulus oriented polystyrene film (OPS) attached to non-woven polypropylene (PP) fabric on one or both sides of the film. The OPS film has excellent tensile strength and modulus, tear strength, and low water vapor permeability. The non-woven fabric promotes bonding to the cement core and any finish materials on the surface of the board. But for using a different composite air/water barrier-non-woven fibrous mat sheet this cement board was made the same way as was that of Example 2 to be a board of nominal half inch thickness. Thus, the cement board was made by applying the aqueous cement slurry of TABLE 3 to a scrim layer and the barrier layer made of high modulus OPS film to embed the scrim, contact the cement slurry with the outer layer of non-woven polypropylene, and have the cement slurry penetrate the outer layer of non-woven Polypropylene and embed the scrim. The cement slurry penetrating through the scrim and into the non-woven fabric of the membrane and formed a good bond. The scrim and air/water barrier was applied on both sides of the cement board as in Example 2. After the cement board was formed it was dried in a kiln.

TABLE 4 lists the typical properties of the barrier layer made of high modulus oriented polystyrene film (OPS).

TABLE 4

Typical properties for OPS film

|  | ASTM test method | Value |
|---|---|---|
| Specific gravity (g/cc) | D1505-10 | 1.05 |
| Tensile strength (psi) | D882-12 | 8,000-12,000 |
| Modulus of elasticity (ksi) | D882-12 | 420-450 |
| Hardness (Rockwell M) | D785-08 (2015) | 85 |
| Tear strength (lbs/mil) | D1004-13 | 1.1 |
| Chemical resistance to acids and alkalis | D543-14 | Excellent |
| Water vapor transmission rate (WVTR)'s, g/100 in$^2$, 24 hr at 100° F., 95% RH |  | 6.0/mil |

CLAUSES OF THE INVENTION

The following clauses describe various aspects of the invention.

Clause 1. A building exterior sheathing panel comprising:
a cementitious panel comprising a cementitious core selected from:
a gypsum panel comprising a gypsum panel core layer, wherein the gypsum panel core layer comprises greater than 75 weight % calcium sulfate dihydrate, typically at least 85 weight % calcium sulfate dihydrate, more typically at least 95 weight % calcium sulfate dihydrate, and a gypsum panel fibrous mat attached as a cover sheet to the gypsum panel core layer, wherein the gypsum panel fibrous mat comprises at least one of polymer fibers, glass fibers, mineral fibers or a combination thereof, wherein the gypsum panel fibrous mat has an absence of paper fibers, and wherein the gypsum panel fibrous mat has an absence of cellulose, or
a cement panel comprising a cement panel core layer, wherein the cement panel cementitious core is made from an aqueous mixture containing 50 to 100 wt. % reactive powder on a dry (water free) basis, wherein the reactive powder comprises at least 10 weight percent set hydraulic cement and at most 75 wt. % calcium sulfate dihydrate,
an air/water barrier sheet which overlays the cementitious panel and is attached to the cementitious panel, wherein the air/water barrier sheet comprises an air/water barrier layer, wherein the air/water barrier sheet optionally has an air/water barrier sheet fibrous mat layer attached to the air/water barrier layer, wherein the air/water barrier sheet fibrous mat, if present, comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose,
an adhesive layer between the cementitious panel and the air/water barrier layer,
wherein the adhesive layer attaches an entire surface of a side of the air/water barrier sheet to the gypsum panel fibrous mat on a side of the gypsum panel facing the air/water barrier sheet, or
wherein the adhesive layer attaches an entire surface of a side of the air/water barrier sheet to a side of the cement panel facing the air/water barrier sheet, or
wherein the adhesive layer attaches an entire surface of a side of the air/water barrier layer to the air/water barrier sheet fibrous mat layer when the air/water barrier sheet fibrous mat layer is embedded in the cement core layer,
wherein each respective said air/water barrier sheet is individually attached to only a single respective said cementitious panel, wherein each respective said air/water barrier sheet entirely covers a side of the respective cementitious panel,
wherein the air/water barrier sheet has a perm rating in the range of less than or equal to 0.15, preferably less than or equal to 0.1, the air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheet, or combinations thereof adhered by the layer of adhesive to the at least one fibrous mat-faced surface of the fibrous mat-faced cementitious panel, wherein the metal sheet and metal sheet of the coated metal sheet have a thickness between 0.0002 and 0.005 inches, typically 0.0002-0.003 inches, wherein the perm rating is according to a desiccant method with Procedure A of ASTM E96 (2016).

Clause 2. The sheathing panel of clause 1, comprising the gypsum panel, wherein the cementitious core comprises at least 85 weight % calcium sulfate dihydrate.

Clause 3. The sheathing panel of clause 1, comprising the cement panel, wherein the cementitious core comprises more than 30 wt. %, typically at least 40 wt. %, and more typically at least 60 wt. % hydraulic cement.

Clause 4. The sheathing panel of clause 1, comprising the cement panel, wherein the cement panel comprises a layer of scrim embedded into or on the surface of the cement core.

Clause 5. The sheathing panel of clause 1, wherein the cementitious core results from setting an aqueous mixture of a cementitious composition comprising, on a dry (water free) basis,
50 to 95 wt % reactive powder,
1 to 20 wt % of coated hydrophobic expanded perlite particles uniformly distributed as lightweight filler therein, the coated hydrophobic perlite particles having a diameter in the range of about 1 to 500 microns (micrometers), a median diameter, as measured on a volume size distribution basis, of 20 to 150 microns (micrometers) and an effective particle density (specific gravity) of less than about 0.50 g/cc,
0 to 25 wt % hollow ceramic microspheres, and
3 to 16 wt. % uniformly distributed alkali-resistant glass fibers;
wherein the reactive powder comprises:
25 to 75 wt. % calcium sulfate alpha hemihydrate,
10 to 75 wt. % hydraulic cement comprising Portland cement,
0 to 3.5 wt. % lime, and
5 to 30 wt. % of an active pozzolan; and the panel cementitious core having a density of 50 to 100 pounds per cubic foot.

Clause 6. The sheathing panel of clause 1, wherein the cementitious core results from setting an aqueous mixture comprising the reactive powder, wherein the reactive powder comprises 35 to 75 wt. %, preferably 45-65 wt. %, more preferably 55 to 65 wt. % calcium sulfate alpha hemihydrate, 20 to 55 wt. %, preferably 25-40 wt. % hydraulic cement such as Portland cement, 0.2 to 3.5 wt. % lime, and 5 to 25 wt. %, preferably 10-15 wt. % of an active pozzolan, wherein the continuous phase of the cementitious core is uniformly reinforced with alkali-resistant glass fibers.

Clause 7. The sheathing panel of clause 1, wherein the metal sheet is aluminum foil, and the coated metal sheet is coated aluminum foil.

Clause 8. The sheathing panel of clause 1, wherein the polymer sheet is high-density polyethylene sheet or the metalized polymer sheet.

Clause 9. The sheathing panel of clause 1, wherein the air/water barrier sheet comprises the polymer sheet, wherein polymer of the polymer sheet comprises a polyethylene, rubber, polyacrylate, polyurethane, polystyrene, styrene acrylic copolymer or a combination thereof.

Clause 10. The sheathing panel of clause 1, wherein the polymer layer has a thickness in the range from 0.001 to 0.020 inches.

Clause 11. A method of making exterior sheathing panel from a gypsum panel or a cement panel of any of clauses 1-10, comprising:

providing a cementitious panel comprising a cementitious core selected from a gypsum panel comprising a gypsum panel core layer, wherein the gypsum panel core layer comprises greater than 75 weight % calcium sulfate dihydrate, typically at least 85 weight % calcium sulfate dihydrate, more typically at least 95 weight % calcium sulfate dihydrate, and a gypsum panel fibrous mat attached as a cover sheet to the gypsum panel core layer, wherein the gypsum panel fibrous mat comprises at least one of polymer fibers, glass fibers, mineral fibers or a combination thereof, wherein the gypsum panel fibrous mat has an absence of paper fibers, and wherein the gypsum panel fibrous mat has an absence of cellulose, or a cement panel comprising a cement panel core layer, wherein the cement panel cementitious core is made from an aqueous mixture containing 50 to 100 wt. % reactive powder on a dry (water free) basis, wherein the reactive powder comprises at least 10 weight percent set hydraulic cement and at most 75 wt. % calcium sulfate dihydrate, providing an air/water barrier sheet which overlays the cementitious panel and is attached to the cementitious panel, wherein the air/water barrier sheet comprises an air/water barrier layer, wherein the air/water barrier sheet optionally has an air/water barrier sheet fibrous mat layer attached to the air/water barrier layer, wherein the air/water barrier sheet fibrous mat, if present, comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose, locating an adhesive layer between the cementitious panel and the air/water barrier layer, wherein the adhesive layer attaches an entire surface of a side of the air/water barrier sheet to the gypsum panel fibrous mat on a side of the gypsum panel facing the air/water barrier sheet, or wherein the adhesive layer attaches an entire surface of a side of the air/water barrier sheet to a side of the cement panel facing the air/water barrier sheet, or wherein the adhesive layer attaches an entire surface of a side of the air/water barrier layer to the air/water barrier sheet fibrous mat layer when the air/water barrier sheet fibrous mat layer is embedded in the cement core layer, wherein each respective said air/water barrier sheet is individually attached to only a single respective said cementitious panel, wherein each respective said air/water barrier sheet entirely covers a side of the respective cementitious panel, wherein the air/water barrier sheet has a perm rating in the range of less than or equal to 0.15, preferably less than or equal to 0.1, the air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheet, or combinations thereof adhered by the layer of adhesive to the at least one fibrous mat-faced surface of the fibrous mat-faced cementitious panel, wherein the metal sheet and metal sheet of the coated metal sheet have a thickness between 0.0002 and 0.005 inches, typically 0.0002-0.003 inches, wherein the perm rating is according to a desiccant method with Procedure A of ASTM E96 (2016).

Clause 12. The method of clause 11, wherein the adhesive layer is applied to at least one entire surface of at least one of the cementitious panel or the air/water barrier sheet by spray coating, roll coating or flood coating to locate the adhesive layer between the cementitious panel and the air/water barrier layer.

Clause 13. The method of clause 11, wherein the adhesive layer is applied to the fibrous mat on the fibrous mat-faced cementitious panel having the set cementitious core to form a laminate having the adhesive layer; and then the air/water barrier sheet is applied to contact the adhesive layer on the fibrous mat on the side of the fibrous mat-faced cementitious panel.

Clause 14. The method of clause 11, wherein the adhesive layer may be applied to the air/water barrier sheet to form a laminate having the adhesive layer; and then the laminate is applied to the cementitious panel having the set cementitious core to contact the adhesive layer with the fibrous mat on the side of the cementitious panel.

Clause 15. A method of making exterior sheathing panel of any of clauses 3-10 having the cement panel, wherein the cement panel cementitious core is made from an aqueous mixture containing 50 to 100 wt. % reactive powder on a dry (water free) basis, wherein the reactive powder comprises at least 10 weight percent set hydraulic cement and at most 75 wt. % calcium sulfate dihydrate, comprising:

providing an air/water barrier sheet comprising an outer layer of an air/water barrier sheet fibrous mat layer attached to an air/water barrier layer, wherein the air/water barrier sheet fibrous mat comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose, feeding the air/water barrier sheet onto a moving surface of the manufacturing line with the fibrous mat facing up away from the moving surface, optionally feeding the scrim to overlay the air/water barrier sheet fibrous mat facing up away from the moving surface;

then depositing the aqueous mixture on the air/water barrier sheet fibrous mat and optionally the scrim while the air/water barrier sheet and optionally the scrim are moving on the moving surface, wherein the aqueous mixture penetrates the fibrous mat and if the optional scrim is present, embeds the optional scrim, and then allowing the aqueous mixture to set (harden) to form a panel precursor and cutting the panel precursor to a desired length to form the exterior sheathing panels having the cement panel core, wherein each respective said air/water barrier sheet is individually attached to only a single respective said cementitious panel, wherein each respective said air/water barrier sheet entirely covers a side of the respective cementitious panel, wherein an adhesive layer is located between the cementitious panel and the air/water barrier layer, wherein the adhesive layer attaches an entire surface of a side of the air/water barrier layer to the air/water barrier sheet fibrous mat layer when the air/water barrier sheet fibrous mat layer is embedded in the cement core layer, wherein each exterior sheathing panel has one said air/water barrier sheet attached to only a single respective said cementitious panel, wherein each respective said air/water barrier sheet entirely covers a side of the respective cementitious panel, wherein the air/water barrier sheet has a perm rating in the range of less than or equal to 0.15, preferably less than or equal to 0.1, the air/water barrier sheet comprising any of a metal sheet (e.g., aluminum foil), coated metal sheet (e.g., coated aluminum foil), polymer sheet (e.g., polyethylene sheets like high-density polyethylene sheets), metalized polymer sheet, or combinations thereof adhered by the layer of adhesive to the at least one fibrous mat-faced surface of the fibrous mat-faced cementitious panel, wherein the metal sheet and metal sheet of the coated metal sheet have a thickness between 0.0002 and 0.005 inches, typically 0.0002-0.003 inches, wherein the perm rating is according to a desiccant method with Procedure A of ASTM E96 (2016).

Clause 16. The method of clause 15, wherein the scrim is fed to overlay the fibrous mat.

Clause 17. The method of clause 15, wherein the laminate fibrous mat-air/water barrier sheet is pre-made.

Clause 18. The method of clause 15, wherein the laminate fibrous mat-air/water barrier sheet is made on the manufacturing line by applying adhesive directly to a side of the air/water barrier sheet and contacting the adhesive-bearing side of the air/water barrier sheet directly to a fibrous mat to form the fibrous mat-laminate air/water barrier sheet.

Clause 19. The method of clause 15, wherein the air/water barrier sheet is pre-made, wherein the adhesive layer attaches an entire surface of a side of the air/water barrier layer to the air/water barrier sheet fibrous mat layer when the air/water barrier sheet fibrous mat layer is embedded in the cement core layer or the air/water barrier sheet is made on the manufacturing line by applying the adhesive layer directly to a side of the air/water barrier layer and contacting the adhesive-bearing side of the air/water barrier layer directly to the air/water barrier sheet fibrous mat.

Clause 20. The method of clause 11 or 18, wherein the layer of adhesive is applied at least one entire surface of the air/water barrier sheet by spray coating, roll coating or flood coating to locate the adhesive layer between the cementitious panel and the air/water barrier sheet.

Clause 21. An exterior sheathing system of a building comprising framing to which is attached a plurality of said exterior sheathing panels of any of claims 1 to 10, wherein the air/water barrier exteriorly faces away from the framing, wherein the exterior sheathing panel is on an exterior of the building.

Clause 22. The system of clause 21, wherein the exterior sheathing panels are attached to the framing by any one or more of screws, nails, or glue.

Clause 23. The system of clause 22, wherein the exterior sheathing panel has no perforations except for perforations made by the screws or nails.

We claim:

1. A method of making exterior sheathing panel from a gypsum panel or a cement panel, comprising:

providing a set cementitious panel comprising a set cementitious core selected from:

a set gypsum panel comprising a set gypsum panel core layer, wherein the set gypsum panel core layer comprises greater than 75 weight % calcium sulfate dihydrate, and a gypsum panel fibrous mat attached as a cover sheet to the set gypsum panel core layer wherein the cover sheet is embedded in the set gypsum panel core layer, wherein the gypsum panel fibrous mat comprises at least one of polymer fibers, glass fibers, mineral fibers or a combination thereof, wherein the gypsum panel fibrous mat has an absence of paper fibers, and wherein the gypsum panel fibrous mat has an absence of cellulose, or a cement panel comprising a set cement panel cementitious core layer, wherein the cement panel cementitious core layer is made from setting an aqueous mixture containing 50 to 100 wt. % reactive powder on a dry basis, wherein the set reactive powder comprises at least 10 weight percent set hydraulic cement and at most 75 wt. % calcium sulfate dihydrate, providing an air/water barrier sheet which overlays the cementitious panel and is attached to the cementitious panel, wherein the air/water barrier sheet comprises an air/water barrier layer comprising any of a metal sheet, coated metal sheet, polymer sheet, or combinations thereof, wherein the air/water barrier sheet optionally has an air/water barrier sheet fibrous mat layer attached to the air/water barrier layer, wherein the air/water barrier sheet fibrous mat, if present, comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose, locating an adhesive layer between the cementitious panel and the air/water barrier layer, wherein the adhesive layer attaches an entire surface of a side of the air/water barrier sheet to the gypsum panel fibrous mat embedded on a side of the set gypsum panel facing the air/water barrier sheet, or wherein the adhesive layer attaches an entire surface of a side of the air/water barrier sheet to a side of the cement panel facing the air/water barrier sheet, wherein the adhesive layer is located directly on the set cementitious core layer between the cement panel and the air/water barrier layer and the air/water barrier sheet is not embedded in the cementitious core layer, or wherein the adhesive layer attaches an entire surface of a side of the air/water barrier layer directly to the air/water barrier sheet fibrous mat layer when the air/water barrier sheet fibrous mat layer is embedded in the set cement cementitious core layer, wherein said air/water barrier layer is individually attached to a respective said set cementitious panel, wherein each respective said air/water barrier sheet entirely covers a side of the respective set cementitious panel, wherein the air/water barrier sheet has a perm rating in the range of less than or equal to 0.15, wherein the metal sheet and metal sheet of the coated metal sheet have a thickness between 0.0002 and 0.003 inches, wherein the perm rating is according to a desiccant method with Procedure A of ASTM E96 (2016).

2. The method of claim 1, wherein the set cementitious panel is the set cement panel, wherein the adhesive layer attaches the entire surface of the side of the air/water barrier sheet to the side of the cement panel facing the air/water barrier sheet, wherein the adhesive layer is located directly on the set cementitious core layer between the cement panel and the air/water barrier layer and the air/water barrier sheet is not embedded in the cementitious core layer.

3. The method of claim 1, wherein the adhesive layer is applied to the fibrous mat face on the fibrous mat-faced cementitious panel having the set cementitious core to form the laminate having the adhesive layer; and then the air/water barrier sheet is applied to contact the adhesive layer on the fibrous mat face on the side of the fibrous mat-faced cementitious panel.

4. The method of claim 1, wherein the adhesive layer is applied to the air/water barrier sheet to form the laminate having the adhesive layer; and then the laminate is applied to the cementitious panel having the set cementitious core to contact the adhesive layer with the fibrous mat face on the side of the cementitious panel.

5. A method of making exterior sheathing panel comprising a cement panel, wherein the cement panel has a cementitious core layer that is made from an aqueous mixture containing 50 to 100 wt. % reactive powder on a dry basis, wherein the reactive powder comprises hydraulic cement and at most 75 wt. % calcium sulfate dihydrate, wherein the cementitious core layer comprises more than 30 wt. % hydraulic cement, comprising:

providing an air/water barrier sheet comprising an outer layer of an air/water barrier sheet fibrous mat layer attached to an air/water barrier layer, wherein the air/water barrier sheet fibrous mat comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose, wherein the air/water barrier layer consists of a metal sheet, feeding the air/water barrier sheet onto a moving surface of the manufacturing line with the air/water barrier sheet fibrous mat facing up away from the moving surface, feeding a scrim to overlay the air/water barrier sheet fibrous mat facing up away from the moving surface;

then depositing the aqueous mixture on the air/water barrier sheet fibrous mat and the scrim while the air/water barrier sheet and the scrim are moving on the moving surface, wherein the aqueous mixture penetrates the fibrous mat and embeds the scrim, and then allowing the aqueous mixture to set to form a panel precursor and cutting the panel precursor to a desired length to form the exterior sheathing panels having the cement panel core, wherein each respective said air/water barrier sheet is individually attached to only a single respective said cementitious panel, wherein each respective said air/water barrier sheet entirely covers a side of the respective cementitious panel, wherein an adhesive layer is located between the cementitious core and the air/water barrier layer, wherein the adhesive layer attaches an entire surface of a side of the air/water barrier layer to the air/water barrier sheet fibrous mat layer when the air/water barrier sheet fibrous mat layer is embedded in the cement core layer, wherein each exterior sheathing panel has one said air/water barrier sheet attached to only a single respective said cementitious panel, wherein each respective said air/water barrier sheet entirely covers a side of the respective cementitious panel, wherein the air/water barrier sheet has a perm rating in the range of less than or equal to 0.15, wherein the metal sheet is adhered by the layer of adhesive to the at least one fibrous mat-faced surface of the fibrous mat-faced cementitious panel, wherein the metal sheet has a thickness between 0.0002 and 0.005 inches, wherein the perm rating is according to a desiccant method with Procedure A of ASTM E96 (2016).

6. The method of claim 5, wherein the air/water barrier sheet is pre-made to have the adhesive layer between the air/water barrier layer and the air/water barrier sheet fibrous mat layer.

7. The method of claim 5, wherein the air/water barrier sheet is made on a manufacturing line for the method of making exterior sheathing panel by applying adhesive directly to an exposed side of a layer of the air/water barrier sheet and contacting the adhesive-bearing side directly to the air/water barrier sheet fibrous mat layer.

8. The method of claim 5, wherein the air/water barrier sheet is pre-made, wherein the adhesive layer attaches an entire surface of a side of the air/water barrier layer to the air/water barrier sheet fibrous mat layer when the air/water barrier sheet fibrous mat layer is embedded in the cement core layer.

9. The method of claim 1, wherein the set cementitious panel is the set cement panel, wherein the air/water barrier sheet fibrous mat layer is present and the adhesive layer attaches the metal sheet directly to the air/water barrier sheet fibrous mat layer embedded in the set cementitious core layer.

10. The method of claim 9, wherein the air/water barrier layer consists of the metal sheet and the air/water barrier sheet fibrous mat layer is present.

11. The method of claim 1, wherein the air/water barrier layer consists of the metal sheet, wherein the air/water barrier sheet has an absence of polymer sheet, and an absence of metalized polymer sheet, wherein the air/water barrier sheet fibrous mat comprises glass fibers.

12. The method of claim 1, wherein the air/water barrier layer consists of the metal sheet, wherein the metal sheet is aluminum foil, or coated metal sheet wherein the coated metal sheet is coated aluminum foil, and the air/water barrier sheet has an absence of polymer sheet.

13. The method of claim 1, wherein the air/water barrier layer consists of the metal sheet, wherein the metal sheet is aluminum foil.

14. The method of claim 1, wherein the cementitious core layer results from setting an aqueous mixture comprising the reactive powder, wherein the reactive powder comprises
    35 to 75 wt. % calcium sulfate alpha hemihydrate,
    20 to 55 wt. % hydraulic cement,
    0.2 to 3.5 wt. % lime, and
    5 to 25 wt. % of an active pozzolan,
    wherein the continuous phase of the cementitious core layer is uniformly reinforced with alkali-resistant glass fibers.

15. The method of claim 1, comprising the cement panel, wherein the cementitious core layer comprises more than 30 wt. % hydraulic cement.

16. A method of making exterior sheathing panel comprising a cement panel,
    wherein the cement panel has a cementitious core layer that is made from an aqueous mixture containing 50 to 100 wt. % reactive powder on a dry basis, wherein the reactive powder comprises hydraulic cement and at most 75 wt. % calcium sulfate dihydrate, wherein the cementitious core layer comprises more than 30 wt. % hydraulic cement, comprising:
    providing an air/water barrier sheet comprising an outer layer of an air/water barrier sheet fibrous mat layer attached to an air/water barrier layer,
    wherein the air/water barrier sheet fibrous mat comprises at least one of polymer fibers, glass fibers, mineral fibers or a combination thereof, wherein the air/water barrier sheet fibrous mat has an absence of paper fibers, and wherein the air/water barrier sheet fibrous mat has an absence of cellulose,
    wherein the air/water barrier layer consists of a metal sheet, wherein the metal sheet is aluminum foil, or a coated metal sheet wherein the coated metal sheet is coated aluminum foil, and the air/water barrier sheet has an absence of polymer sheet,
    feeding the air/water barrier sheet onto a moving surface of the manufacturing line with the air/water barrier sheet fibrous mat facing up away from the moving surface,
    feeding a scrim to overlay the air/water barrier sheet fibrous mat facing up away from the moving surface;
    then depositing the aqueous mixture on the air/water barrier sheet fibrous mat and the scrim while the air/water barrier sheet and the scrim are moving on the moving surface, wherein the aqueous mixture penetrates the fibrous mat and embeds the scrim, and
    then allowing the aqueous mixture to set to form a panel precursor and cutting the panel precursor to a desired length to form the exterior sheathing panels having the cement panel core, wherein each respective said air/water barrier sheet is individually attached to only a single respective said cementitious panel, wherein each respective said air/water barrier sheet entirely covers a side of the respective cementitious panel,
    wherein an adhesive layer is located between the cementitious core and the air/water barrier layer,
    wherein the adhesive layer attaches an entire surface of a side of the air/water barrier layer to the air/water barrier sheet fibrous mat layer when the air/water barrier sheet fibrous mat layer is embedded in the cement core layer,
    wherein each exterior sheathing panel has one said air/water barrier sheet attached to only a single respective said cementitious panel, wherein each respective said air/water barrier sheet entirely covers a side of the respective cementitious panel,
    wherein the air/water barrier sheet has a perm rating in the range of less than or equal to 0.15, the metal sheet or coated metal sheet is adhered by the layer of adhesive to the at least one fibrous mat-faced surface of the fibrous mat-faced cementitious panel,
    wherein the metal sheet and metal sheet of the coated metal sheet have a thickness between 0.0002 and 0.005 inches, wherein the perm rating is according to a desiccant method with Procedure A of ASTM E96 (2016).

17. The method of claim 5, wherein the metal sheet is aluminum foil.

18. The method of claim 5, wherein the cementitious core layer results from setting an aqueous mixture comprising the reactive powder, wherein the reactive powder comprises
    35 to 75 wt. % calcium sulfate alpha hemihydrate,
    20 to 55 wt. % Portland cement,
    0.2 to 3.5 wt. % lime, and
    5 to 25 wt. % of an active pozzolan,
    wherein the continuous phase of the cementitious core layer is uniformly reinforced with alkali-resistant glass fibers.

19. The method of claim 16, wherein the air/water barrier layer consists of the coated metal sheet.

\* \* \* \* \*